USO11352216B2

(12) United States Patent
Reischl et al.

(10) Patent No.: US 11,352,216 B2
(45) Date of Patent: Jun. 7, 2022

(54) UNLOADING STATION AND METHOD FOR UNLOADING A CONVEYED-GOODS CONTAINER LOADED WITH CONVEYED GOODS

(71) Applicant: TGW Mechanics GmbH, Wels (AT)

(72) Inventors: Josef Reischl, Gunskirchen (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 17/045,636

(22) PCT Filed: Apr. 9, 2019

(86) PCT No.: PCT/AT2019/060121
§ 371 (c)(1),
(2) Date: Oct. 6, 2020

(87) PCT Pub. No.: WO2019/195871
PCT Pub. Date: Oct. 17, 2019

(65) Prior Publication Data
US 2021/0155415 A1    May 27, 2021

(30) Foreign Application Priority Data

Apr. 13, 2018  (AT) .............................. A 50320/2018
Feb. 13, 2019  (AT) .............................. A 50109/2019

(51) Int. Cl.
*B65G 47/61* (2006.01)
*B65G 19/02* (2006.01)
*B65G 9/00* (2006.01)

(52) U.S. Cl.
CPC .......... *B65G 47/61* (2013.01); *B65G 19/025* (2013.01); *B65G 9/002* (2013.01); *B65G 9/004* (2013.01); *B65G 2201/0238* (2013.01)

(58) Field of Classification Search
CPC ...... B65G 47/61; B65G 19/025; B65G 9/002; B65G 9/004; B65G 2201/0238
(Continued)

(56) References Cited

U.S. PATENT DOCUMENTS

| 1,994,782 | A | * | 3/1935 | Olson | .................... | B65G 47/61 |
|---|---|---|---|---|---|---|
|  |  |  |  |  |  | 104/94 |
| 4,509,635 | A | * | 4/1985 | Emsley | .................. | B07C 3/082 |
|  |  |  |  |  |  | 198/370.03 |

(Continued)

FOREIGN PATENT DOCUMENTS

| AT | 521961 B1 | 7/2020 |
|---|---|---|
| AT | 522067 A4 | 8/2020 |

(Continued)

OTHER PUBLICATIONS

International Search Report in PCT/AT2019/060121, dated Jul. 24, 2019.

(Continued)

*Primary Examiner* — Gene O Crawford
*Assistant Examiner* — Lester Rushin, III
(74) *Attorney, Agent, or Firm* — Collard & Roe, P.C.

(57) ABSTRACT

The invention relates to an unloading station (4) for automated unloading of an article container (2), which comprises an overhead conveying device (1) for transporting the article container (2) into the unloading station and for transporting the article container out of the unloading station, an opening and closing device (40) for adjusting a bag body between the closed position and the opened position and an unloading device (39) for unloading the bag body. The unloading device comprises an actuation device (56), by means of which the article container with the bag body can be tilted about a tilting axis (57) extending essentially in parallel to the longitudinal extension of the overhead conveying device (Continued)

Figure 5:
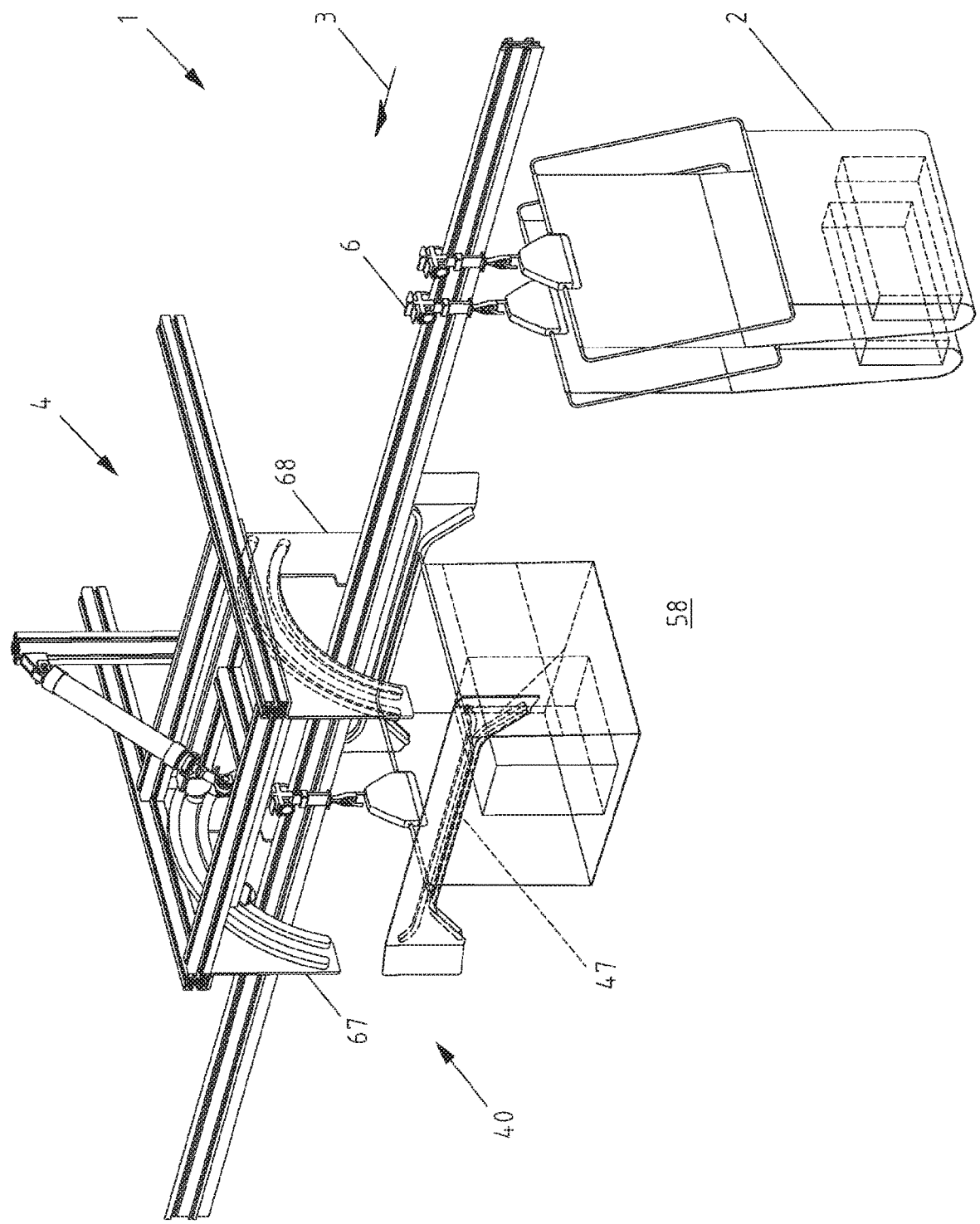

between a provisioning position (58) and an unloading position (59), wherein in the unloading position an article (28) can be discharged from the article container through the unloading opening (29). Moreover, the invention relates to a method for the automated unloading of an article container.

53 Claims, 25 Drawing Sheets

(58) Field of Classification Search
USPC .................................................. 198/465.4
See application file for complete search history.

(56) References Cited

U.S. PATENT DOCUMENTS

| | | | |
|---|---|---|---|
| 8,607,963 B2 | 12/2013 | Wend et al. | |
| 8,672,118 B2 | 3/2014 | Janzen et al. | |
| 9,212,013 B2 | 12/2015 | Fankhauser et al. | |
| 10,005,616 B2 * | 6/2018 | Fenile .................... | B65G 47/61 |
| 10,040,641 B2 | 8/2018 | Fenile et al. | |
| 10,301,114 B2 | 5/2019 | Fenile | |
| 10,322,887 B2 * | 6/2019 | Fenile .................... | B65G 47/36 |
| 10,336,548 B2 | 7/2019 | Fenile et al. | |
| 10,370,179 B2 | 8/2019 | Schneuing | |
| 10,494,196 B2 | 12/2019 | Fenile | |
| 10,647,523 B2 * | 5/2020 | Sigrist .................... | B65G 9/002 |
| 2018/0086563 A1 | 3/2018 | Janzen et al. | |
| 2020/0024074 A1 | 1/2020 | Herzog-Lang et al. | |

FOREIGN PATENT DOCUMENTS

| | | |
|---|---|---|
| CH | 710 650 A1 | 7/2016 |
| CN | 105501827 A | 4/2016 |
| CN | 107406198 A | 11/2017 |
| DE | 10 2004 018 569 A1 | 11/2005 |
| DE | 10 2010 053 590 A1 | 6/2012 |
| DE | 10 2011 015 138 A1 | 9/2012 |
| DE | 10 2011 080 280 A1 | 2/2013 |
| DE | 20 2017 106 993 U1 | 12/2017 |
| EP | 2 130 968 A1 | 12/2009 |
| EP | 2 196 415 A | 6/2010 |
| EP | 2 418 160 A1 | 2/2012 |
| EP | 2 554 497 A1 | 2/2013 |
| EP | 2 708 478 A1 | 3/2014 |
| EP | 3 028 961 A1 | 6/2016 |
| EP | 2 686 258 B1 | 9/2016 |
| EP | 3 293 130 A1 | 3/2018 |
| GB | 1 221 711 A | 2/1971 |
| JP | H07-304514 A | 11/1995 |
| WO | 2014/044601 A1 | 3/2014 |
| WO | 2017/088076 A1 | 6/2017 |
| WO | 2018/130712 A1 | 7/2018 |

OTHER PUBLICATIONS

Encyclopedia of Chinese Posts and Telecommunications: Posts (Nov. 30, 1994) (with English translation of entries).

* cited by examiner

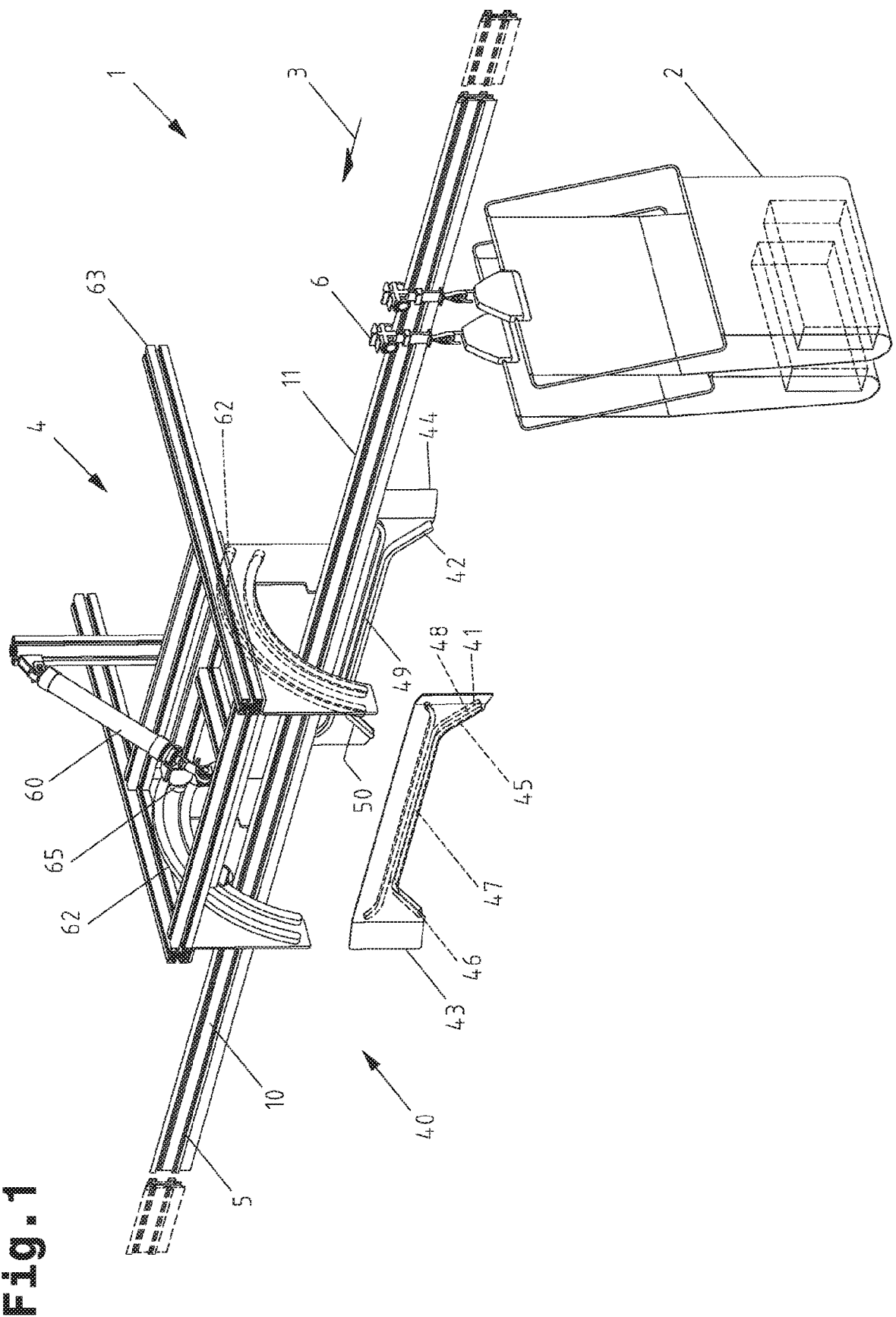

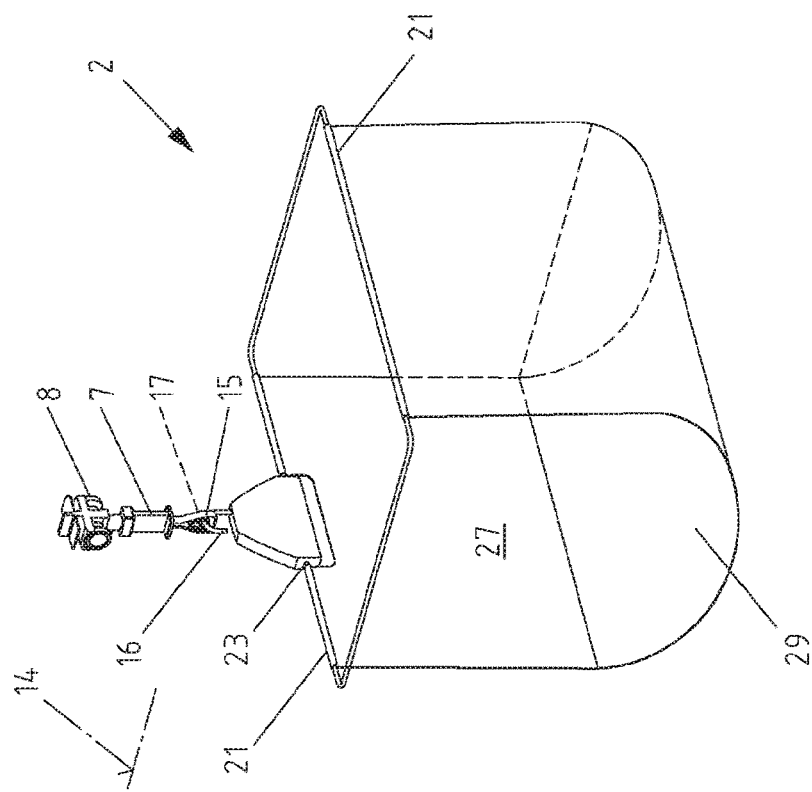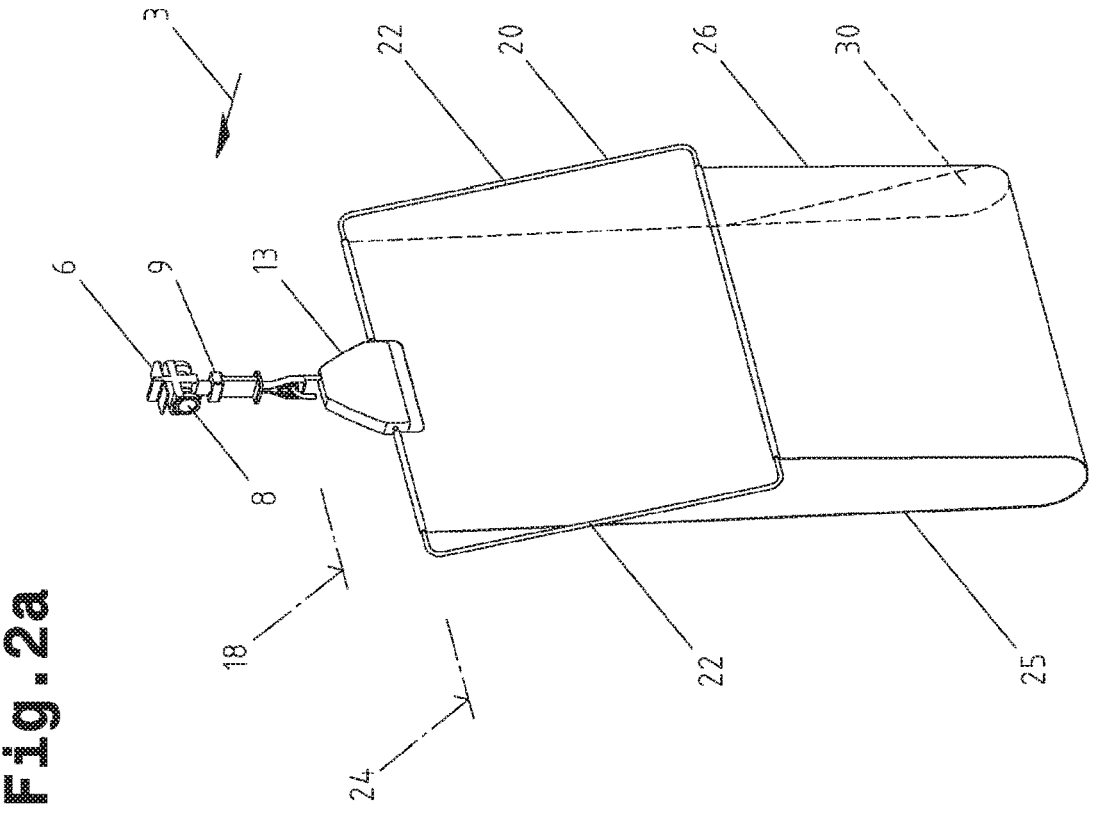

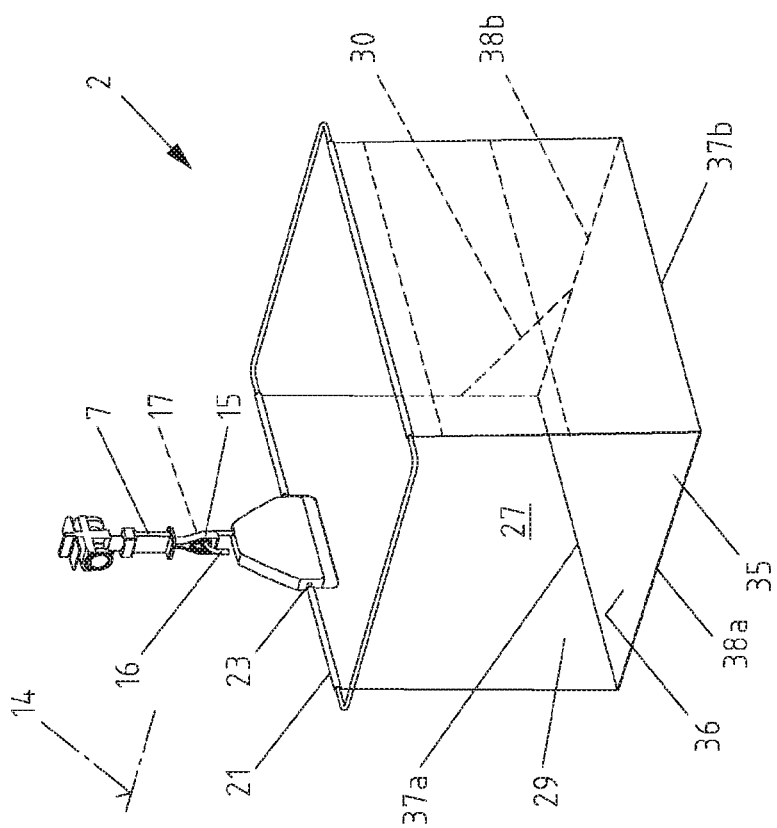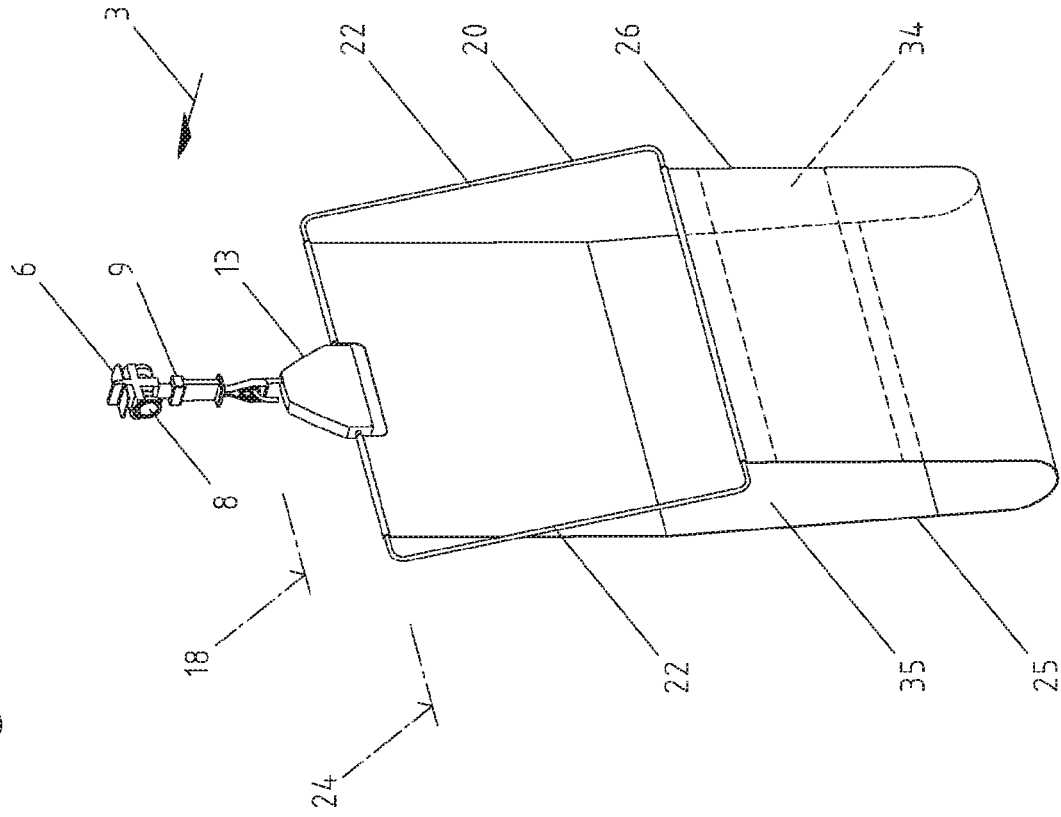

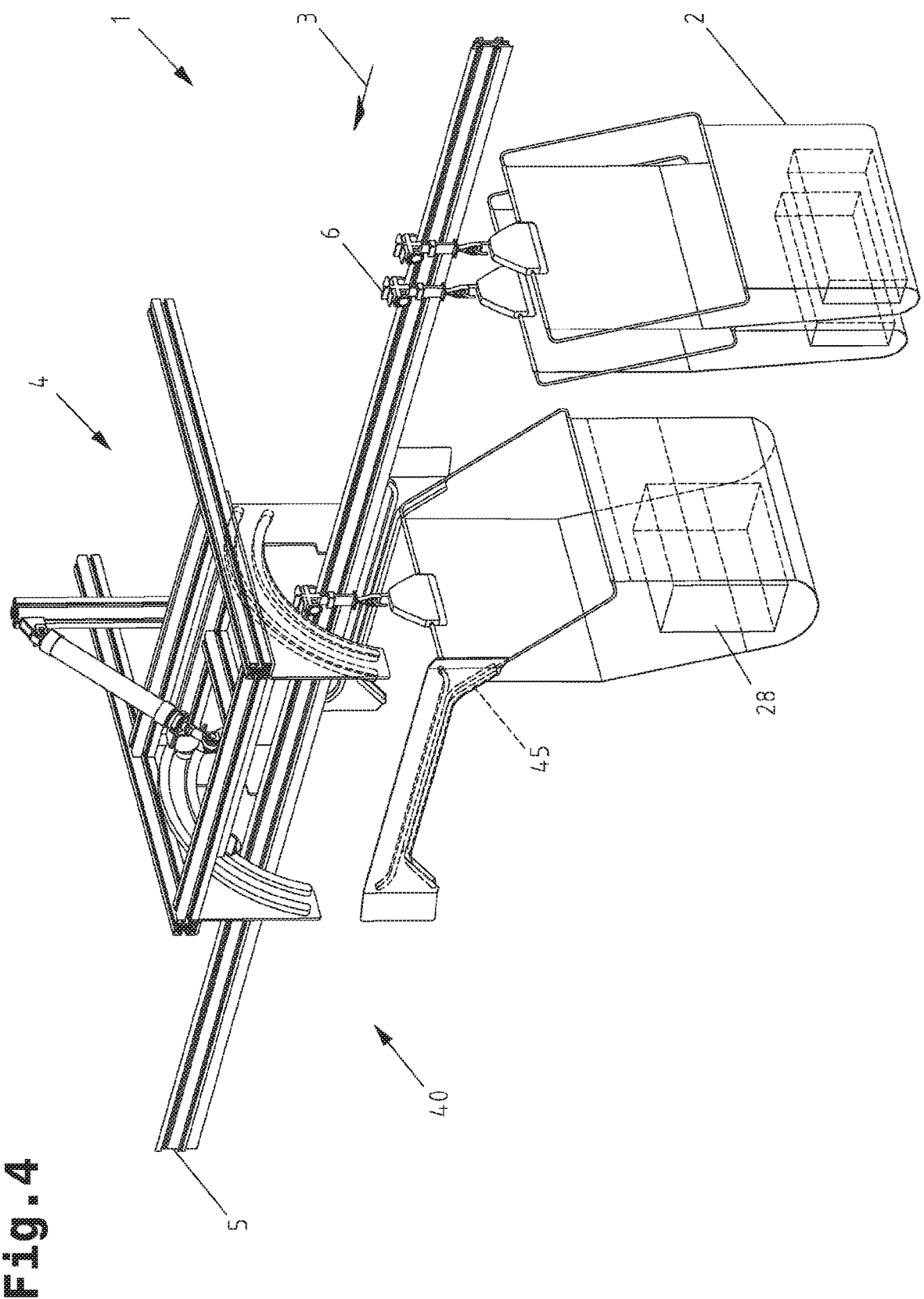

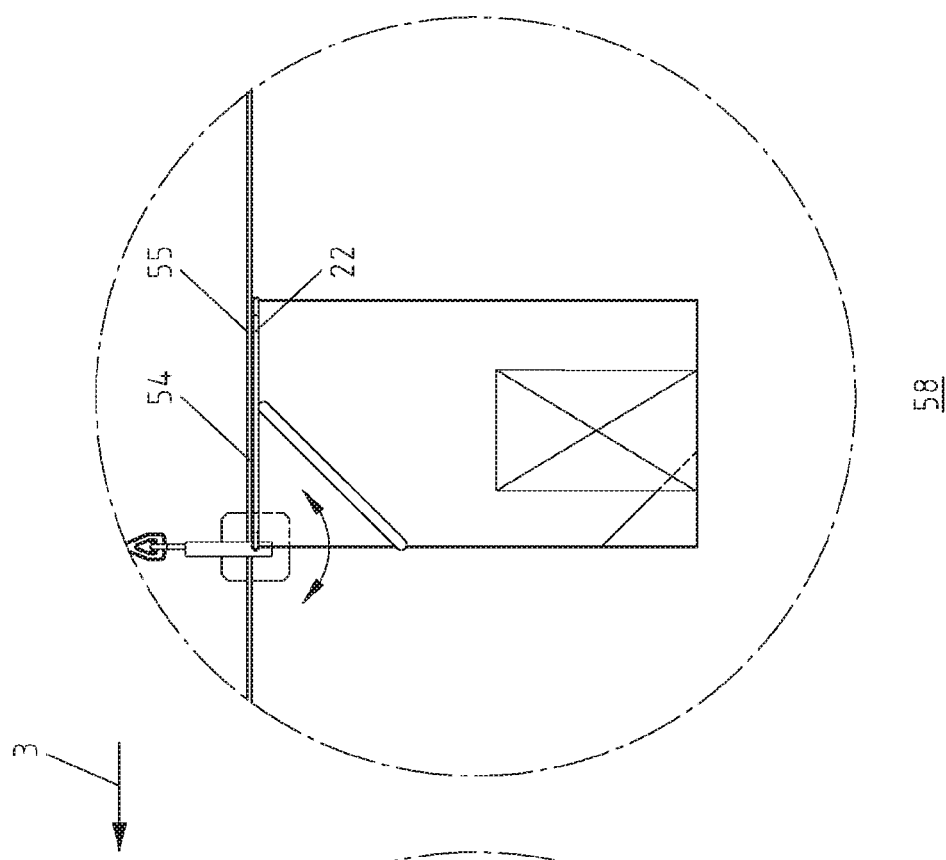
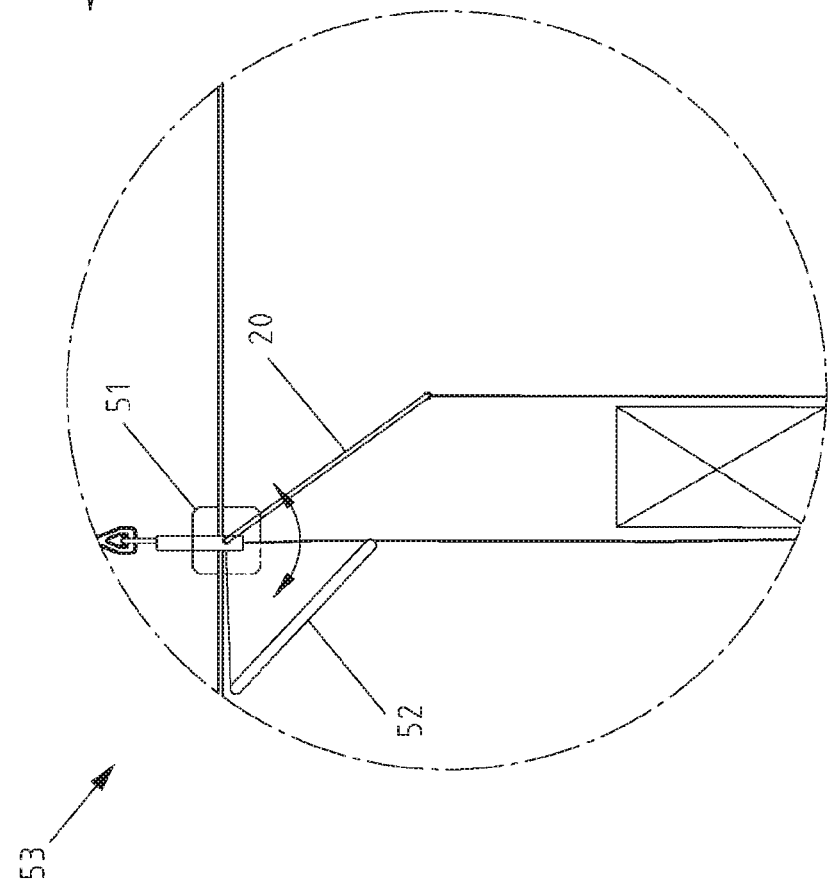

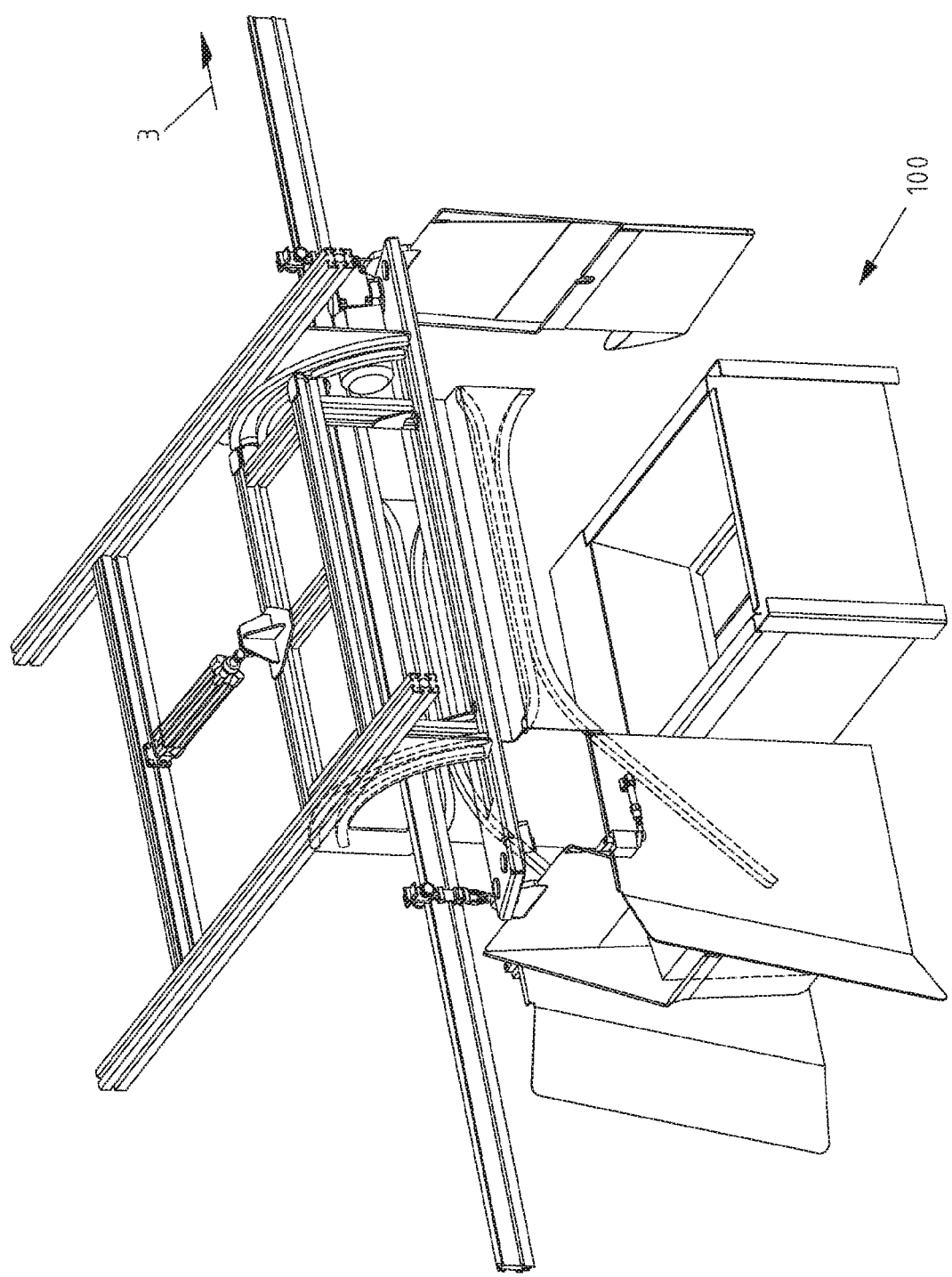

Fig.21a
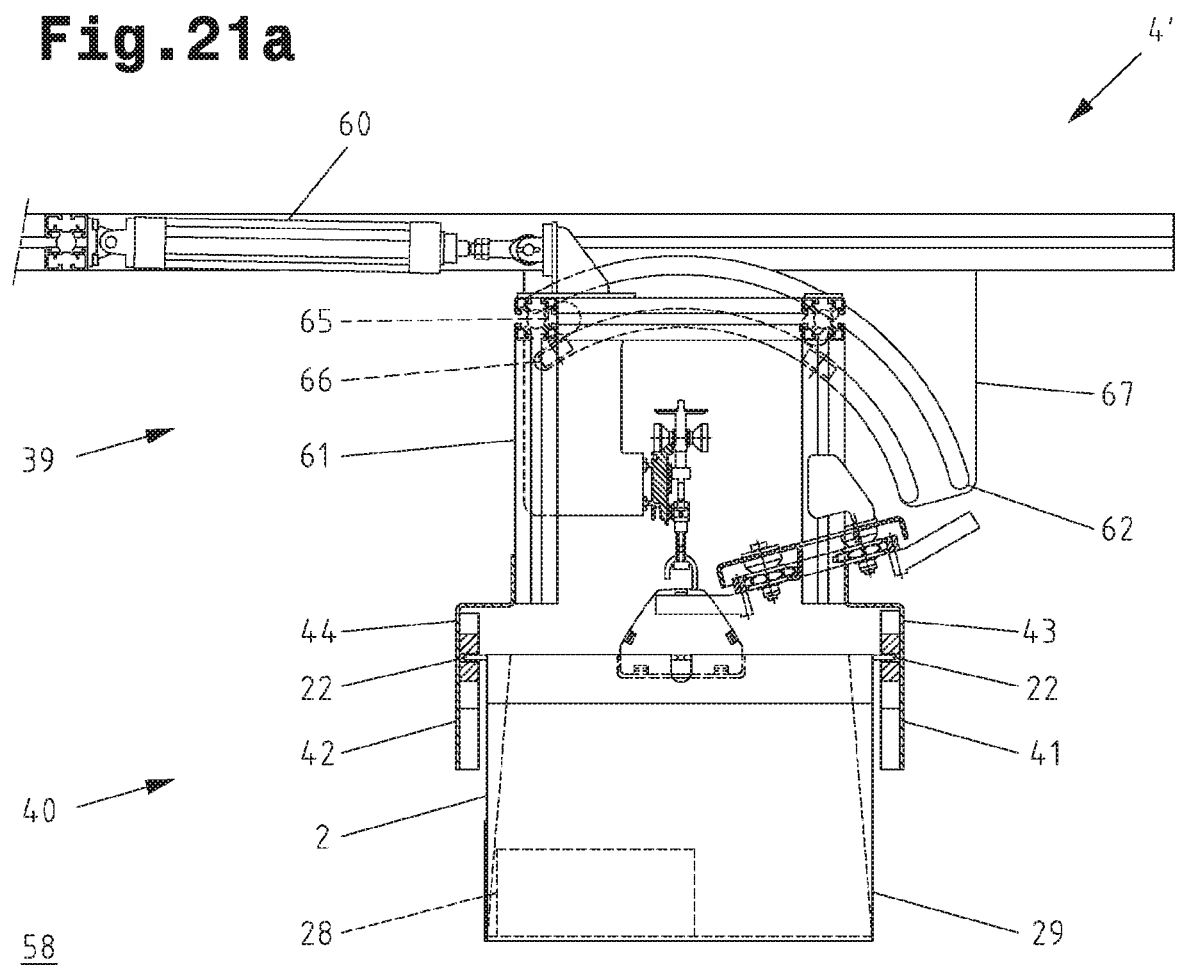
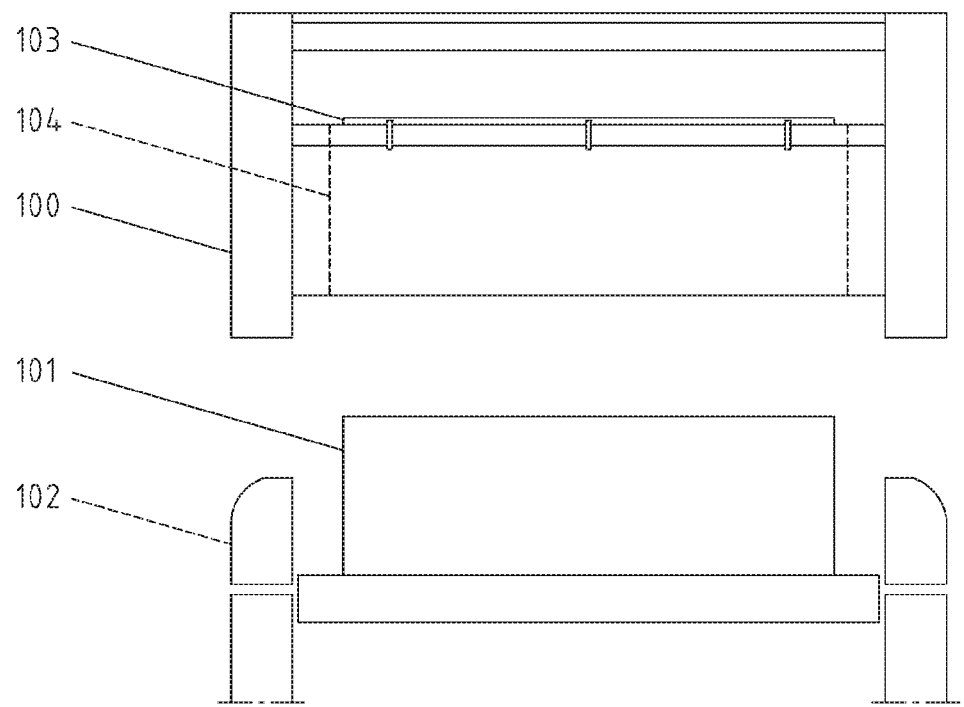

Fig.21c
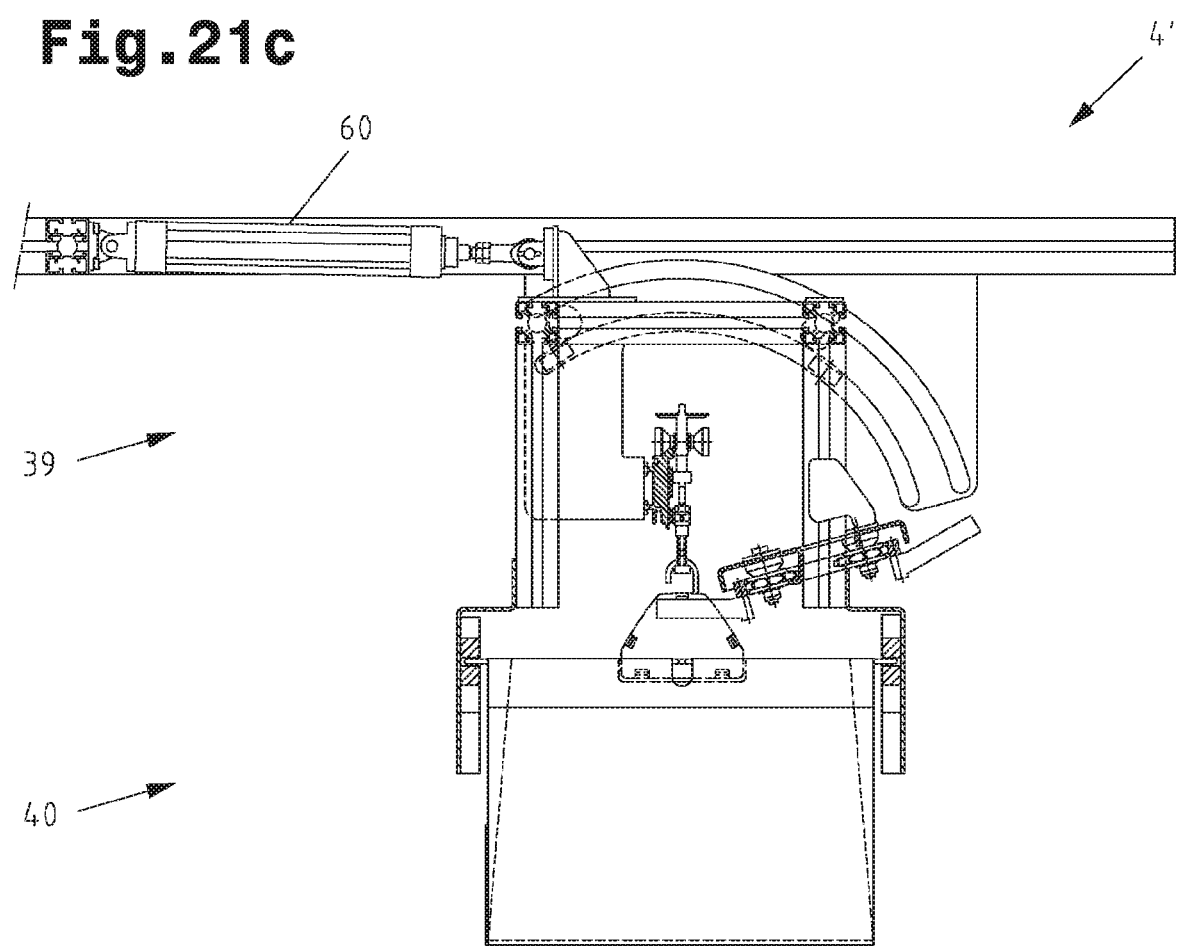
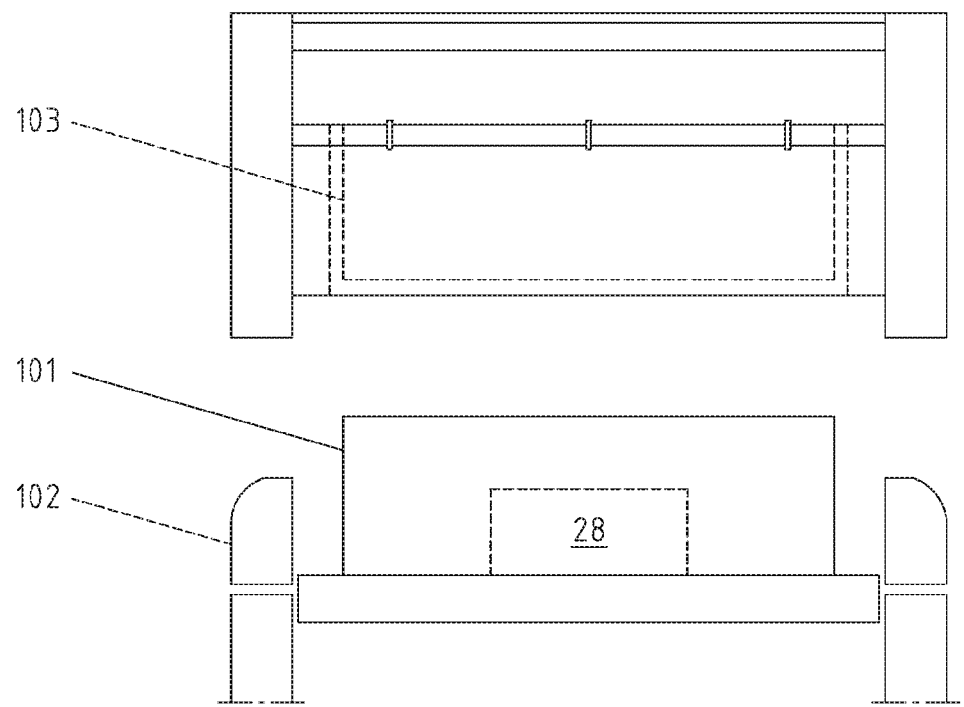

UNLOADING STATION AND METHOD FOR UNLOADING A CONVEYED-GOODS CONTAINER LOADED WITH CONVEYED GOODS

CROSS REFERENCE TO RELATED APPLICATIONS

This application is the National Stage of PCT/AT2019/060121 filed on Apr. 9, 2019, which claims priority under 35 U.S.C. § 119 of Austrian Application Nos. A 50320/2018 filed on Apr. 13, 2018 and A 50109/2019 filed on Feb. 13, 2019, the disclosures of which are incorporated by reference. The international application under PCT article 21(2) was not published in English.

The invention relates to an unloading station and a method for unloading an article container loaded with at least one article according to the preamble of claims 1 and 33.

DE 20 2017 106 993 U1 discloses an article container having a bag body with a front wall and a rear wall, a storage space bounded by the front wall and the rear wall and an unloading opening formed laterally on the bag body at least in some sections between the front wall and the rear wall. The bag body is adjustable between a closed position, in which the storage space is minimized in volume and the articles can be transported by means of the article container, and an opened position, in which the storage space is maximized in volume and the articles can be manually removed from the article container through the unloading opening. Automatic unloading is neither provided nor possible.

WO 2014/044601 A1 discloses automatic unloading of articles from an article container, in which the article container, which is suspended on a transport carrier via a suspended support, is tilted about a tilting axis running perpendicular to the overhead conveying device. The articles are discharged onto a discharge conveyor. Since the height of fall should be as low as possible, the article containers are moved just above the discharge conveyor. As a consequence, the article container to be unloaded has to be moved in the tilted unloading position across a long transport path, which places heavy strain on the bag body of the article container. This significantly reduces the operational lifetime of the article containers. Moreover, the unloading station requires a large installation space.

EP 2 686 258 B1 relates to an overhead conveyor system having an article container for the automated unloading of loaded articles and having an unloading station. The article container has a horizontal bottom on which the articles can be stored for transport purposes. The bottom cooperates with a lifting device which is configured for lifting the bottom of the article container loaded with at least one article, when the article container is in an unloading position, in a vertical direction such that the at least one article can be centrally pushed out by means of a pushing device through an end wall of a base body of the article container, and wherein the pushing device comprises a slider which engages with an interior of the base body through a different end wall of the base body where the at least one article is located when the bottom is lifted. This means that for unloading, the two opposite, opened end walls, the bottom which is liftable in the vertical direction as well as the slider of the pushing device reaching through one of the end walls are required.

Comparable article containers and associated overhead conveying devices are also known from DE 10 2004 018 569 A1, EP 2 130 968 A1 or EP 2 196 415 A, for example. The article containers described therein consist of flexible materials in the form of a loop in which the articles are held. For loading, these transport bags are opened at the top in order to be able to insert the article into the loop. An unloading is done by the article either being taken or ejected sideways from the loop or the loop being opened at the bottom, for example in accordance with EP 2 130 968 A1.

It was the object of the invention to provide an improved unloading station and an improved method for the automatic unloading of an article container of an overhead conveyor system.

In particular, the unloading operation should be accelerated and it should be possible to unload the article container in a particularly gentle way.

The object of the invention is achieved in that the unloading device comprises an actuation device, by means of which the article container with the bag body can be tilted about a tilting axis extending essentially in parallel to the longitudinal extension of the overhead conveying device between a provisioning position and an unloading position, wherein in the unloading position, the articles can be discharged from the article container through the unloading opening.

However, the object of the invention is also achieved in that for unloading articles from an article container i) in one step, the bag body is adjusted from the closed position into the opened position by means of the opening and closing device, and ii) in one step, the article container with the bag body is tilted about a longitudinal axis extending essentially in parallel to the longitudinal extension of the overhead conveying device from a provisioning position into an unloading position by means of the unloading device, whereby the articles are discharged from the article container through the unloading opening.

The discharge direction of the articles extends in a discharge plane extending transversely to the transport direction of the article container. The articles can hence be transported only across a very short discharge path, which significantly reduces the discharge time as compared to the unloading stations known from the prior art. Moreover, it is possible to place a take-over plane, to which the conveyed material is to be delivered, essentially at the level of the unloading opening, such that a particularly gentle transfer of the conveyed material to the take-over plane is possible. The take-over plane is for example defined by a conveying device. The bag body can be adjusted into the opened position prior to tilting of the article container from the provisioning position into the unloading position, or the article container is already adjusted from the provisioning position into the unloading position into the opened position during the opening operation of the bag body.

According to a further embodiment of the invention, the article container can additionally comprise a suspended support for suspended transport on the overhead conveying device and having a receptacle, a frame by means of which the bag body is suspended on the suspended support and which is mounted in the receptacle on the suspended support so as to be pivotable about a longitudinal axis of the receptacle relative to the suspended support, whereby the bag body can be adjusted between the closed position and the opened position.

The frame can be pivoted about the longitudinal axis of the receptacle without a high exertion of force, whereby the opening operation and the closing operation of the bag body can be carried out in a particularly easy manner In an advantageous embodiment of the invention, the frame comprises longitudinal struts and cross struts, wherein the front wall and the rear wall of the bag body are each mounted to one of the cross struts of the frame (in an articulated manner).

The frame can form a rectangular or an essentially square outer contour. In this context, a rectangular and essentially square outer contour means not only a correct square or rectangular shape, but also an outer contour with rounded corners or projections arranged on the longitudinal struts. If the cross struts are longer than the longitudinal struts to allow for a front wall and a rear wall as wide as possible, comparably long articles can be transported. Long longitudinal struts result in a larger difference of the relative horizontal and vertical positions of the front wall and the rear wall when changing between the closed position and the opened position. This results in a maximum width of the articles, which are transported by means of the article containers.

If the cross struts and the longitudinal struts have essentially the same lengths, the storage space is optimized for a broad spectrum of articles. In particular, it is also advantageous that in the opened position, the unloading opening is widely spread between the front and rear wall, such that the unloading operation can be carried out particularly reliably and easily.

Conversely, a loading operation of the article container can also be carried out particularly easily. In principal, loading can be carried out from above through the frame or through a lateral wall opposite to the unloading opening, if designed openly at least in part. In general, the bag body can also be loaded via the unloading opening. Loading can be carried out automatically or manually.

It is favorably for the opening and closing device to comprise an actuation device for automatic opening and closing of the bag body, by means of which actuation device the frame can be pivoted about the longitudinal axis relative to the suspended support such that the bag body can be adjusted between the closed position and the opened position.

The bag body can be adjusted between the closed position and the opened position by means of the frame which is present anyway. This results in a particularly simple structure of the article container. The opening and closing device can also be designed particularly simply.

It also proves to be particularly advantageous if the actuation device comprises a driver mechanism having
an inlet section aligned upstream in the transport direction of the article container,
an outlet section aligned downstream in the transport direction of the article container, and
an unloading section arranged between the inlet section and the outlet section, wherein the inlet section forms a tilted guide track that can be brought into an abutting contact with the frame such that the frame is pivoted during the transport of the article container into the unloading station, whereby the bag body is adjusted from the closed position into the opened position.

The driver mechanism does not require a drive and is thus structured simply. The inlet section comprises a tilted guide track that can be brought into an abutting contact with the frame such that the frame is adjusted between different tilting positions and, in the course of this, the bag body is adjusted from the closed position into the opened position. The adjustment between the closed position and the opened position can be carried out very gently. The article container is handled with care. Moreover, the continuous opening operation of the bag body allows the articles to be centered in the storage space, which facilitates the discharge of the articles from the article container.

It is also advantageous if the unloading section forms an essentially horizontal guide track that can be brought into an abutting contact with the frame such that the frame is held in the pivoted deflection position during the unloading operation, whereby the bag body also remains in the opened position.

The article container can be guided during its tilting movement. The guide track extends in parallel to the transport direction of the article container, as does a tilting axis.

It also proves to be advantageous if the outlet section forms a tilted guide track that can be brought into an abutting contact with the frame such that the frame is pivoted during the transport of the article container out of the unloading station, whereby the bag body is adjusted from the opened position into the closed position.

The outlet section comprises a tilted guide track that can be brought into an abutting contact with the frame such that the frame is adjusted between different tilting positions and, in the course of this, the bag body is adjusted from the opened position into the closed position. The adjustment between the opened position and the closed position can be carried out very gently. The article container is handled with care.

It can also prove to be favorable if the actuation device comprises at least one opening flap movable by means of a drive between a first flap position and a second flap position for adjusting the bag body between the closed position and the opened position.

The opening flap preferably acts on the frame of the article container, in particular on one of the longitudinal struts. If the opening flap comprises a first opening flap and a second opening flap, the opening flaps act synchronously and preferably on the frame of the article container, in particular on both longitudinal struts. The opening flap can be pivotable about an angle and dislocate, in particular pivot, the frame by means of this pivoting movement. In the closed position the opening flap is pivoted out of a path of motion of the frame. In the opened position the opening flap is preferably located below the frame and brings the latter in a horizontal position.

In another possible embodiment of the unloading station, it is provided that the opening flap in the second flap position comprises a guide surface extending in the transport direction of the article container for guiding the frame during a leaving of the unloading station.

By means of the guide surface a desired path of motion of the article container can be achieved during the leaving of the unloading station. If applicable, any vibrations and/or oscillations occurring during the acceleration of the article container can be dampened, so that an overall quieter movement and therefore more careful transport of the articles within the article container are possible.

Further, it is possible that the frame in the second flap position is fixed in a friction fit between the opening flap and a guide profile. The opening flap can be pressed against the frame, so that the latter, in turn, is pressed against the guide profile. In this way the friction fit can be caused. By means of a fixing of the frame, in addition to a causing of the opened position, the entire article container can also be arrested and/or fixed within the loading station.

It proves to be favorable if the overhead conveying device, for the transport of the article container into the unloading station and for the transport of the article container out of the unloading station, comprises transport carriers movable by means of a drive device or by means of gravity, wherein the transport carrier and the suspended support are coupled to one another in an articulated manner, whereby the suspended support is pivotable about an axis extending essentially in parallel to the overhead conveying device relative to the transport carrier.

The transport carrier can be moved by means of a frictional drive or a form-fit drive. An embodiment in which the transport carriers can be moved autonomously by means of a self-propulsion is also possible. The transport carriers can be transported to the unloading station and away from the unloading station very dynamically, which promotes a high unloading performance However, the transport carriers can also be transported by means of gravity if the profile rail on which the transport carriers are moved has a slope. This embodiment is favorable where capital costs are to be kept low.

It can also be provided that a locking device for arresting the transport carrier during an unloading operation of the article container is allocated to the opening and closing device of the unloading station.

The transport carrier is temporally arrested for unloading of the article container, which allows for an unwanted movement of the transport carrier and the article container in the transport direction and/or transversely to the transport direction to be prevented during the tilting movement of the article container. The unloading process can also be carried out particularly reliably for large and/or heavy articles.

It is also possible that the opening and closing device of the unloading station comprises a guide device for laterally guiding the transport carrier during a transport movement of the transport carrier with the overhead conveying device for transporting the article container into the unloading station and transporting the article container out of the unloading station.

For unloading the article container, the transport carrier is guided laterally which prevents unwanted tilting of the transport carrier about an axis extending in the transport direction during the tilting movement of the article container. The unloading process can also be carried out particularly reliably for large and/or heavy articles.

An advantageous design is also possible if the actuation device of the unloading device comprises a frame structure that can be tilted by means of a drive between an initial position and an actuation position about an axis extending in parallel to the transport direction of the article container and the actuation device of the opening and closing device is mounted on the frame structure.

The opening and closing device is moved together with the frame structure that can be tilted between the initial position and the actuation position, which allows for an opening operation of the bag body and the tilting operation of the article container to be carried out simultaneously and/or for a closing operation of the bag body and the back-tilting operation of the article container to be carried out simultaneously. The unloading operation can hence be accelerated additionally. Moreover, the unloading operation can be carried out without stopping of the transport movement. However, in general, the transport speed of the transport carriers and the article container in the transport movement along the unloading station can vary.

It also proves favorable if the bag body further comprises a bottom, wherein the bottom forms
a first longitudinal edge,
a second longitudinal edge extending at a distance from the first longitudinal edge,
a first end edge extending between the first longitudinal edge and the second longitudinal edge,
a second end edge extending between the first longitudinal edge and the second longitudinal edge, and
wherein the unloading opening in the opened position of the bag body is bounded by the front wall and the rear wall and abuts on the first end edge. In particular, the front wall is provided with the bottom.

It is also provided that the unloading opening abuts on the first end edge, which, however, does not exclude a side wall extending between the front wall and rear wall above the unloading opening. It must merely be ensured that the unloading opening is sized in such a way that the largest article can be moved through the unloading opening without colliding with the side wall. In particular it is advantageous that for unloading of the article container an article resting on the bottom can be done through the unloading opening and over the first end edge. In this case, the first end edge can also serve as a tipping edge, enabling a reliable unloading of the article container. In addition, the article container can be manufactured at particularly low cost.

It also proves to be favorable if the bag body comprises a side wall stop abutting on the second end edge, against which the article can be applied.

The additional side wall stop can hold the article in the storage space during transport. While typical articles in the transport position of a respective article container are held between the front wall, rear wall and, optionally, the bottom with sufficient holding force, it proves advantageous if articles deviating from standard measurements or standard forms are additionally held by the side wall stop. Thus, an accidental dropping of the article out of the article container during a transport can be avoided by means of the side wall stop. Further, the article can be pushed into the article container in a simple manner until the former rests against the side wall stop. An accidental dropping out of the article during any too dynamic loading operation can thus be prevented with certainty. Preferably the bottom is inclined toward the side wall stop in order to achieve an even higher level of safety during loading and transport.

However, the article container can also be designed without an additional side wall stop. This is because it has become apparent that typical articles in the closed position of the article container can be held with sufficient holding force between the front wall, rear wall and, optionally, the bottom. Therefore, manufacturing costs of the article container can be reduced to a minimum, as an additional process step in the manufacturing of the side wall stop becomes obsolete. Such a side wall stop is especially cut from a separate material web and joined with the at least one material web for the front wall, rear wall and the bottom, in particular sewn to the front wall and the bottom or the rear wall and, optionally, the bottom. Relinquishing the side wall stop may seem trivial at first sight, but in view of the enormously high number of pieces in a logistics plant it reduces investment costs considerably. If the open side wall is used as the loading opening, the article container can be unloaded at an open first side wall and loaded at an open second side wall without hindrance.

It is particularly advantageous if the first longitudinal edge forms a first folding edge and the second longitudinal edge forms a second folding edge.

The folding edges serve as material hinges to which the bottom is hinged and enable a relative shift between the front wall and rear wall. Thus, the storage space and/or the holding capacity can be increased and decreased. The article container can be used for articles of different sizes and/or be buffered empty in a very space-saving manner or be transported back. It is possible that a width of the bottom between the folding edges amounts to between 5 mm and 800 mm. The width of the bottom between the folding edges can be varied. Therefore, specially adapted article containers are conceivable.

Preferably the bottom can form a holding surface ending in the unloading opening (if according to a first embodiment there is a side wall stop) or in the loading opening (if according to a second embodiment a side wall stop is relinquished), on which the article can be stored if the bag body is adjusted into the opened position. The holding surface can also define a sliding surface. In particular the holding surface extends between the two longitudinal edges and the two end edges. The holding surface abuts immediately on the first end edge and second end edge. The article can be slidably mounted on the sliding surface of the bottom. This facilitates a loading and/or unloading of the article container, and in particular can the article be pushed into the article container and pulled out of it again in a particularly simple manner According to a preferred embodiment, the front wall and the rear wall of the bag body comprise a flexible (non-rigid) material suspended on a frame.

By means of the frame and the flexible material as well as the bottom the storage space can be tentered. A flexible material can be understood to mean a fabric, a foil, a braid, a knitted fabric, a woven fabric and/or similar. By means of the suspended flexible material a very light and flexible-use article container can be provided.

Further, it is possible for the article container to hold, in particular clamp, the article in the transport position between the bottom and the flexible material. The flexible material is preferably supple and can, if applicable, have elastic properties. In this way the article can be surrounded at least in some regions, for example at corners and edges, in a tight-fitting manner by the flexible material. In this way a form and/or friction fit for holding the article within the article container can be caused. The form and/or friction fit can be intensified by a gravity of the article, wherein an autoinhibition can occur.

The flexible material can be at least partially planked for stiffening the article container. Due to the planking a more stable bag body can be provided. The planking can be adapted to different transporting tasks and for example fortify heavily strained regions, in particular of the flexible material.

According to an embodiment of the invention, it is provided that the overhead conveying device, for the transport of the article container into the unloading station and for the transport of the article container out of the unloading station, comprises a guide device and transport carriers movable along the guide device by means of a drive device.

According to an advantageous embodiment, it is provided that the drive device in a conveying section along the unloading station comprises a feed drive, which feed drive has
 a support frame,
 a traction drive which is mounted on the support frame and has a traction means that can be driven by a drive motor and
 at least one driver finger coupled with the traction means for drive movement of the article container along the guide device.

In this regard, it proves to be particularly advantageous if the conveying section forms a transport path along which the article containers are transported, and if the at least one driver finger can be moved between an initial position retracted from the transport path and an engaging position projecting into the transport path by means of the traction drive, wherein the at least one driver finger in the engaging position can be brought into positive locking engagement with the transport carrier or article container and by which the article container can be moved along the conveying section.

For example, the driver finger can come into positive locking engagement with the transport carrier on which the article container is suspended via the suspended support or with the suspended support.

According to an embodiment of the invention, it is provided that the actuation device of the unloading device comprises a frame structure that can be tilted by means of a drive between an initial position and an actuation position about an axis extending in parallel to the transport direction of the article container and that both the actuation device of the opening and closing device and the feed drive are mounted on the frame structure.

It is also advantageous if a positioning device for the article containers is arranged in a conveying section along the unloading station and upstream of the opening and closing device, by means of which positioning device the article container can be positioned relative to the opening and closing device.

According to an advantageous design, the conveying section forms a transport path, along which the article containers are transported, wherein the article container positioning device comprises stopper elements arranged on both sides of the transport path and symmetrically to a vertical plane extending in the direction of the transport path, which stopper elements can be moved between a release position retracted from the transport path and an engaging position projecting into the transport path by means of at least one drive, wherein the article container can be positioned against the stopper elements moved into the engaging position. For example, the article container can be positioned against the stopper elements moved into the engaging position with the frame and/or the front wall such that the article container is in a precise taking-over position when it is positioned against the stopper elements moved into the engaging position. Hence, the driver finger of the feed drive can reliably grip the article container, in particular the suspended support. The stopper elements are for example formed by stopper fingers pivotable between the release position and the engaging position about vertical axes.

In practice, it became apparent that the article containers are more or less prone to pendular movements due to dynamic transport movements. The reason for this is that an article container is suspended in an articulated manner on a transport carrier or is connected in an articulated manner to a transport carrier. Against this background, it is now provided that, in a conveying section along the unloading station and upstream of the opening and closing device, a article container guide device is provided by means of which the pendular movement is prevented or an amplitude of the pendular movement is at least minimized Hence, the article containers can be transferred to the opening and closing device without pendular movements (or with sufficiently minimized pendular movements) also in case of highly dynamical transport movements. Thus, opening and closing the bag body can be carried out reliably.

According to an embodiment of the invention, it is provided that the conveying section forms a transport path, along which the article containers are transported, wherein the article container guide device comprises guide walls arranged on both sides of the transport path and symmetrically to a vertical plane extending in the direction of the transport path. The guide walls are preferably installed stationarily and the article container is moved in the transport direction relative to the guide walls. The frame of the article container is guided between the guide walls and a pendular movement is restricted by the guide walls.

The guide walls can also form inlet chamfers arranged symmetrically to the vertical plane extending in the direction of the transport path and tapering towards each other in a tilted manner in the direction of the opening and closing device. Thereby, centering of the article container, in particular of the bag body, in relation to the transport path can be achieved.

It is also advantageous if at least one of the guide walls is provided with a driver mechanism, wherein the driver mechanism forms a tilted guide track that can be brought into an abutting contact with the frame such that the frame is pivoted during transport of the article container into the opening and closing device, whereby the bag body is adjusted from the closed position in the direction of the opened position. The bag body is partially opened already in front of the opening and closing device by the frame sliding along the guide track. Thus, the bag body is not opened abruptly, but continuously with a constant transport movement. The articles accommodated in the bag body are moved to the bottom of the opened bag body "in a controlled manner" during the opening movement.

It can prove to be advantageous if the unloading station additionally comprises a filling device below the unloading position, by means of which filling device in a first step i), the article dropped by the article container is collected and in a second step ii), the article is transferred to a receiving container. In particular, the filling device comprises a bottom shelf and a bottom opening that can be opened and closed by the bottom shelf.

The bottom shelf divides a height of fall between the article container and the receiving container into at least two (lower) height sections. Thus, an "ordered" transfer of the articles from the article container into the receiving container is allowed for. Hence, already by the adjustment of the bag body from the closed position (transport position) into the opened position (unloading position), the articles are moved in the direction towards the bottom by the rear wall. Due to the tilting movement of the article container, the article slides on the bottom in the direction towards the unloading opening and then falls onto a bottom shelf of the filling device at an angle of less than 60°, in particular at an angle of between 30° and 45°, in relation to a horizontal plane. The angle results from the tilting angle of the article container when tilted into the unloading position. Hence, flexible articles can also be transferred to the bottom shelf "in an ordered manner". After this, the bottom opening is released by the bottom shelf and the article falls essentially perpendicularly downwards into the receiving container provided below the filling device. Hence, an "order" transfer from the filling device into the receiving container is possible, too.

It proves to be advantageous if the unloading station additionally comprises a conveying device for transporting a receiving container into a filling position and for transporting a receiving container away from the filling position, said conveying device being arranged below the filling device. Hence, automated transport of a receiving container to be filled to said position and automated transport of a filled receiving container away from the position can be carried out. Filling of a receiving container is carried out in accordance with a picking order. In this regard, the picking order can comprise one or multiple articles. If multiple articles are required in a picking order, the article containers are unloaded at the unloading station one by one and the receiving container is filled. Once all articles for this picking order have been loaded into the receiving container, the receiving container can be transported away.

According to the method measure, it is provided that step i) and step ii) are carried out sequentially in time, in that the article container is transported to the unloading station by the overhead conveying device and stopped at the unloading station and then in the first step i) the bag body is adjusted from the closed position into the opened position by the opening and closing device, and subsequently in the second step ii) the article container with the bag body, which is adjusted into the opened position, is tilted about the longitudinal axis extending essentially in parallel to the longitudinal extension of the overhead conveying device from the provisioning position into the unloading position by means of the unloading device, whereby the articles are discharged from the article container through the unloading opening.

The bag body is adjusted from the provisioning position into the unloading position into the opened position still before tilting of the (still-standing) article container. Hence, a particularly reliable unloading operation is ensured.

A measure is also advantageous, in which step i) and step ii) are carried out so as to overlap in time, in that the article container is transported to the unloading station by the overhead conveying device and is continuously moved at the unloading station, wherein during the continuous transport movement of the article container in step i) the bag body is adjusted from the closed position into the opened position by the opening and closing device, and simultaneously in step ii) the article container with the bag body is tilted about the longitudinal axis extending essentially in parallel to the longitudinal extension of the overhead conveying device from the provisioning position into the unloading position by means of the unloading device, whereby the articles are discharged from the article container through the unloading opening.

An opening operation of the bag body and the tilting operation of the article container can be carried out simultaneously. The unloading operation can hence be accelerated additionally. Moreover, the unloading operation can be carried out without stopping of the transport movement. However, in general, the transport speed of the transport carriers and the article container in the transport movement along the unloading station can vary. According to these measures, an unloading performance can be maximized It is also advantageous if after unloading the article container and/or discharging the articles from the bag body in a step iii) the article container with the bag body is tilted back from the unloading position into the provisioning position about a tilting axis extending essentially in parallel to the longitudinal extension of the overhead conveying device by means of the unloading device, and in a step iv) the bag body is adjusted from the opened position into the closed position by means of the opening and closing device.

Steps iii) and iv) can be carried out sequentially in time or so as to overlap in time (simultaneously).

If step iii) and step iv) are carried out sequentially in time, the article container after tilting back is moved out of a still-standing position from the unloading station. The tilting back operation and the closing operation of the bag body follow one another (sequentially).

If step iii) and step iv) are carried out so as to overlap in time, a closing operation of the bag body and the tilting back operation of the article container are carried out simultaneously. The unloading operation is carried out without standstill of the transport movement. However, in general, the transport speed of the transport carriers and the article container in the transport movement along the unloading station can vary. According to these measures, an unloading performance can be maximized For the purpose of better understanding of the invention, it will be elucidated in more detail by means of the figures below.

Figure 6:
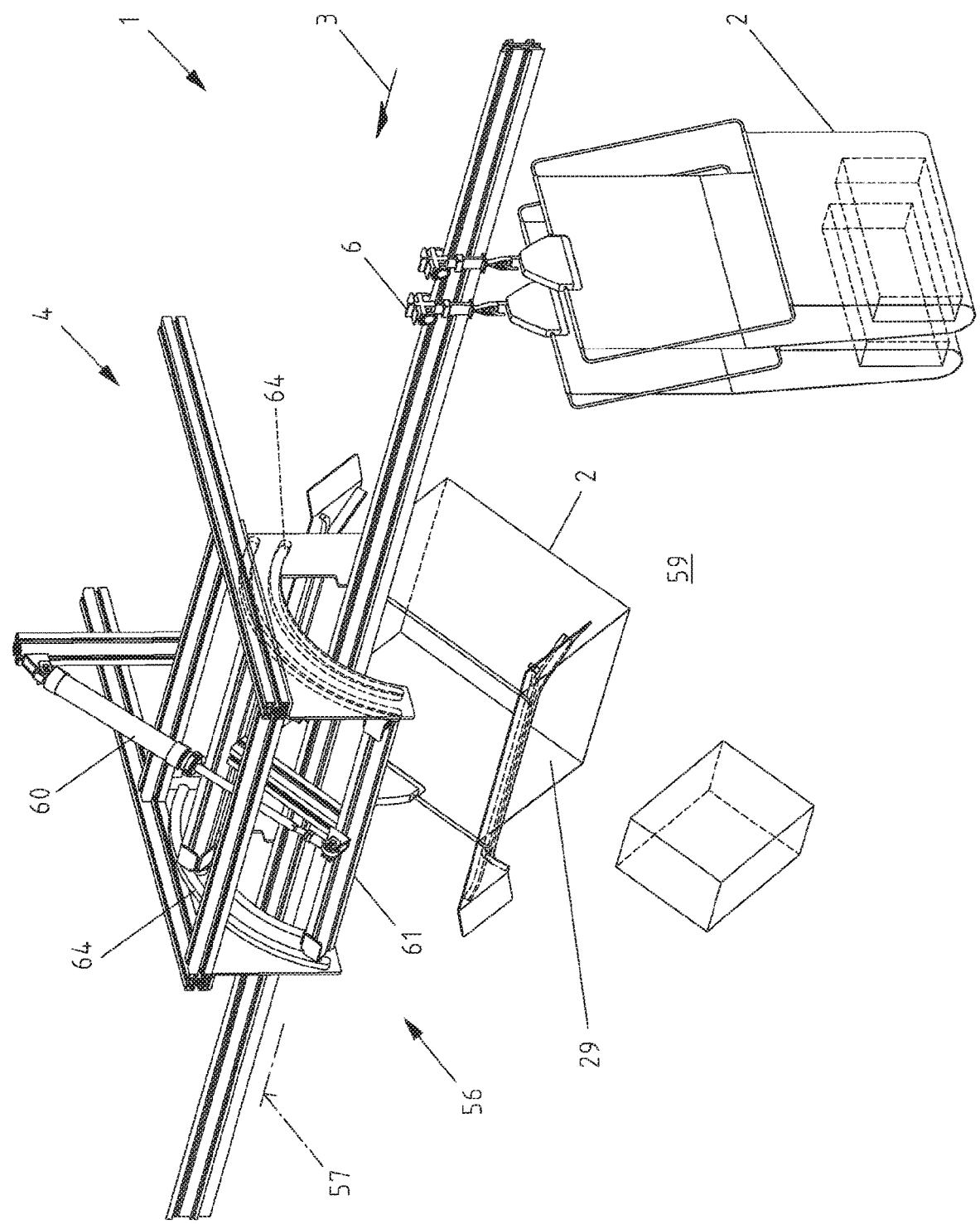
Figure 10:
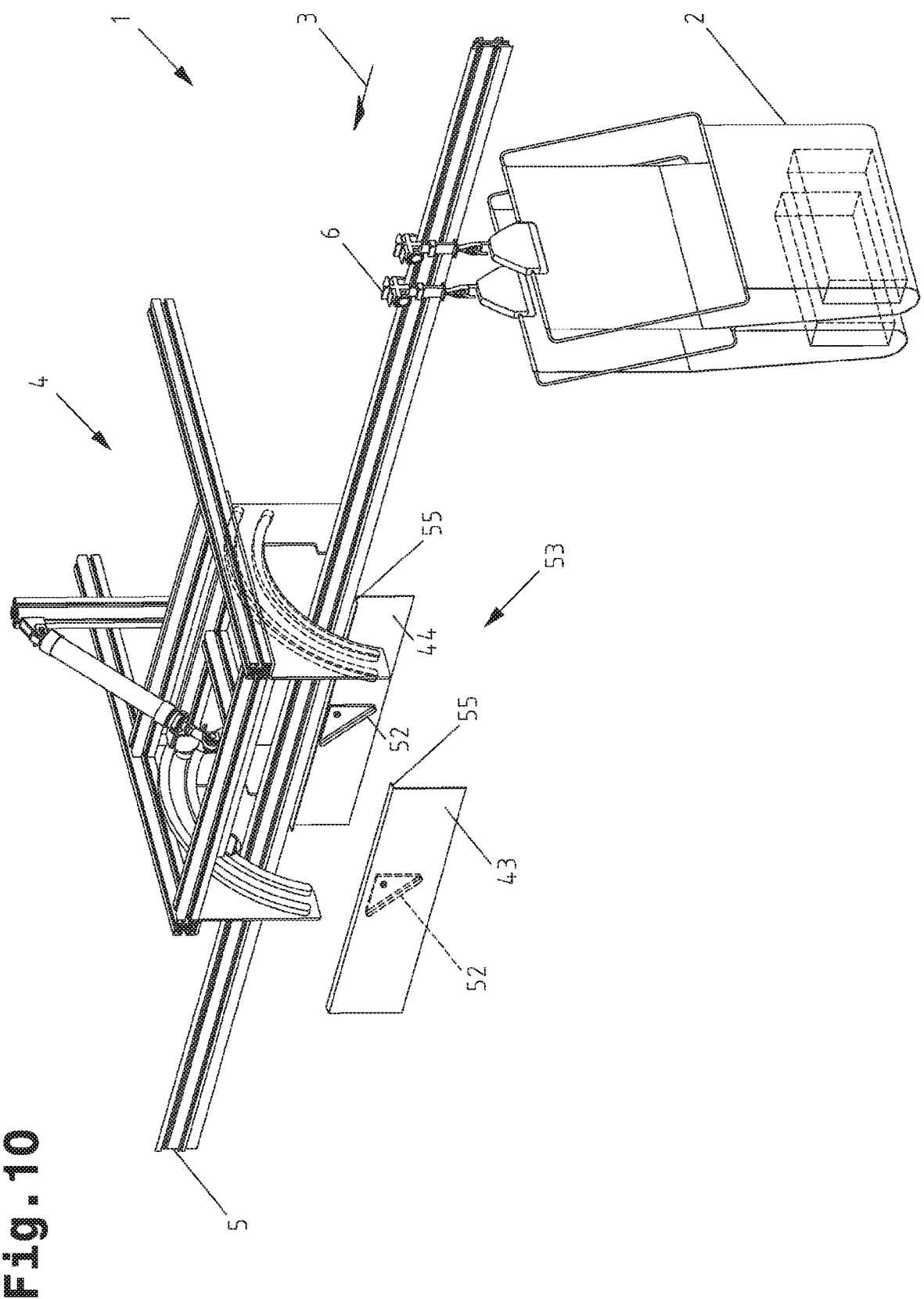
Figure 12A:
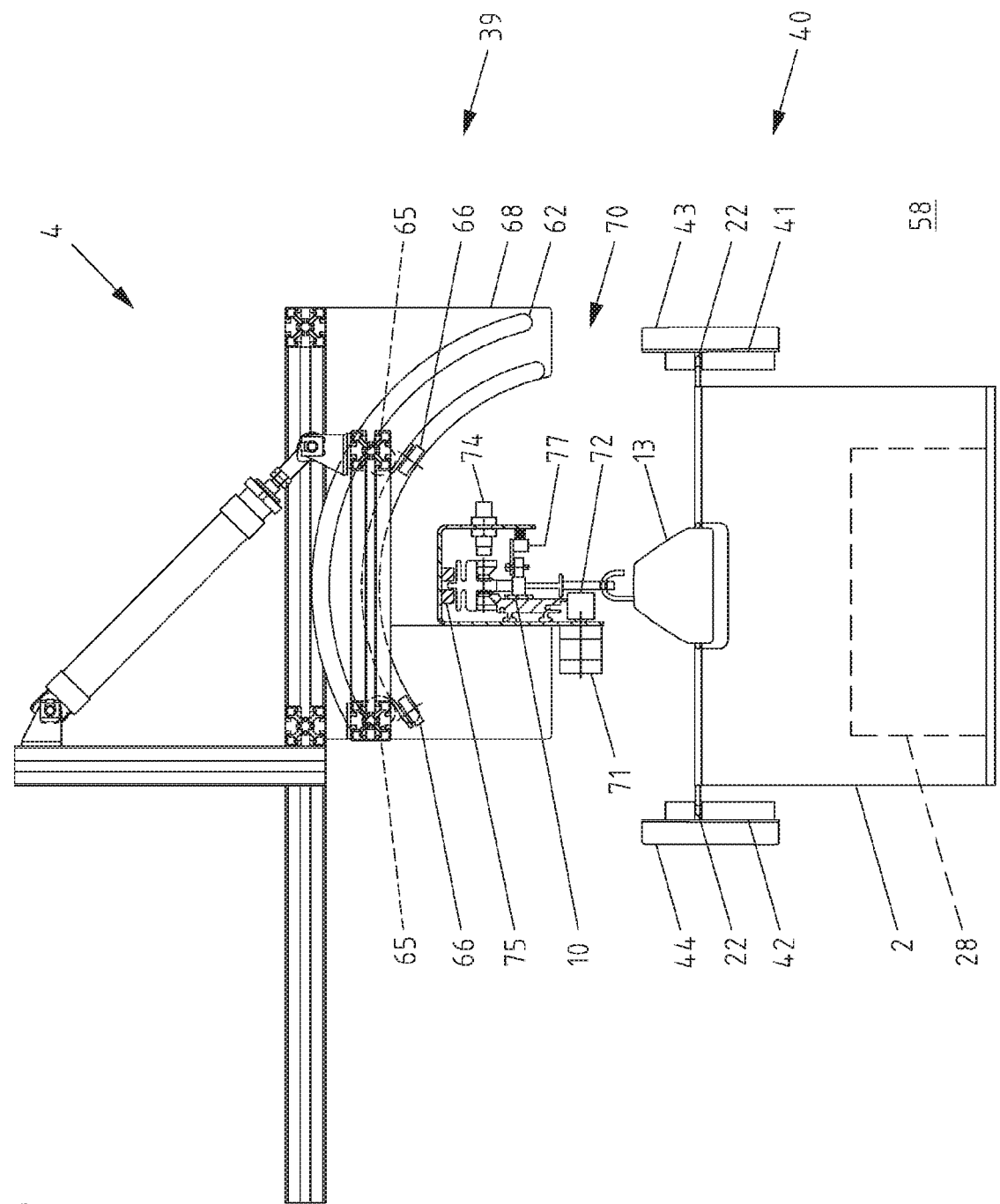
Figure 12B:
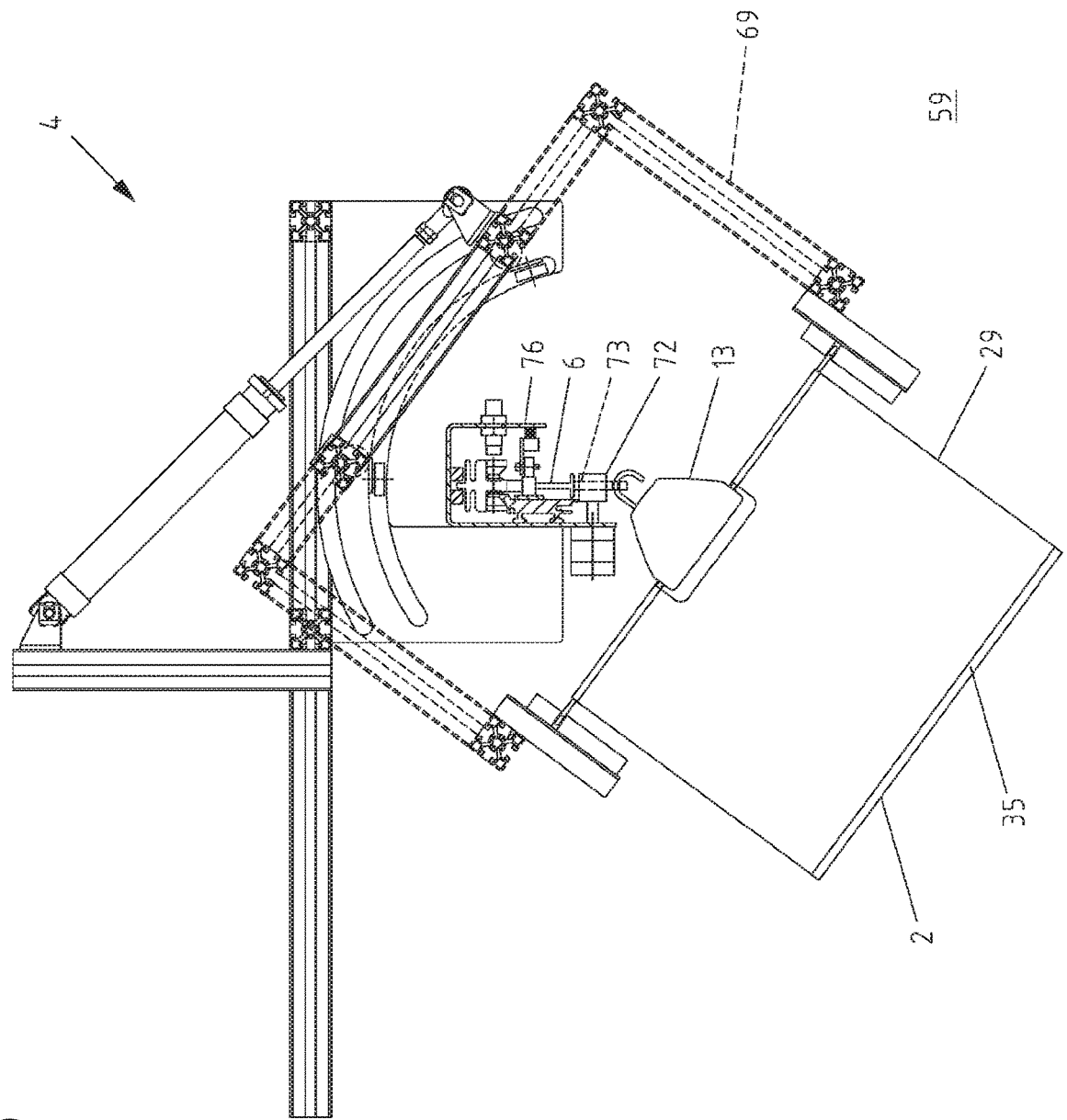
Figure 17:
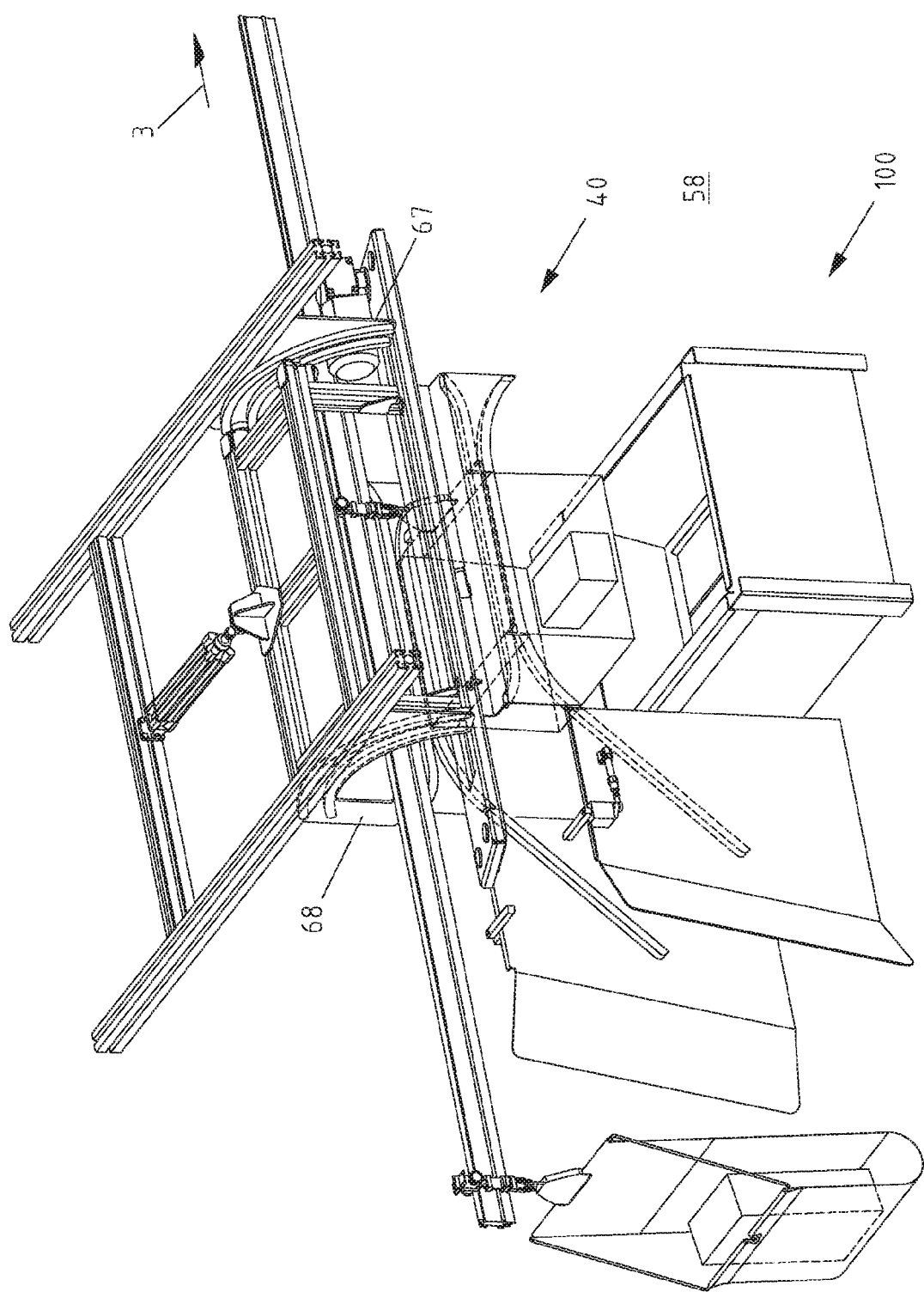
Figure 18:
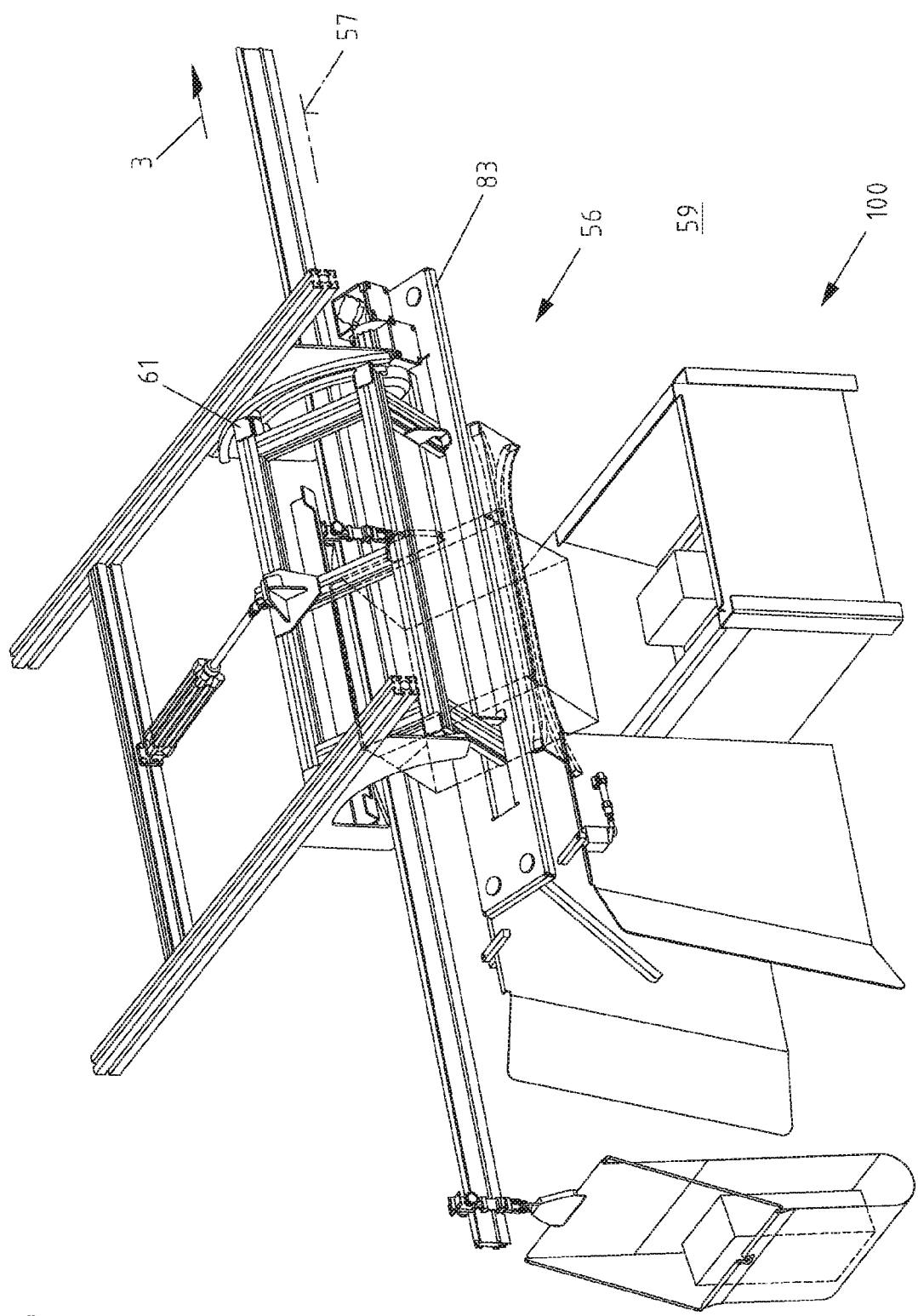
Figure 19:
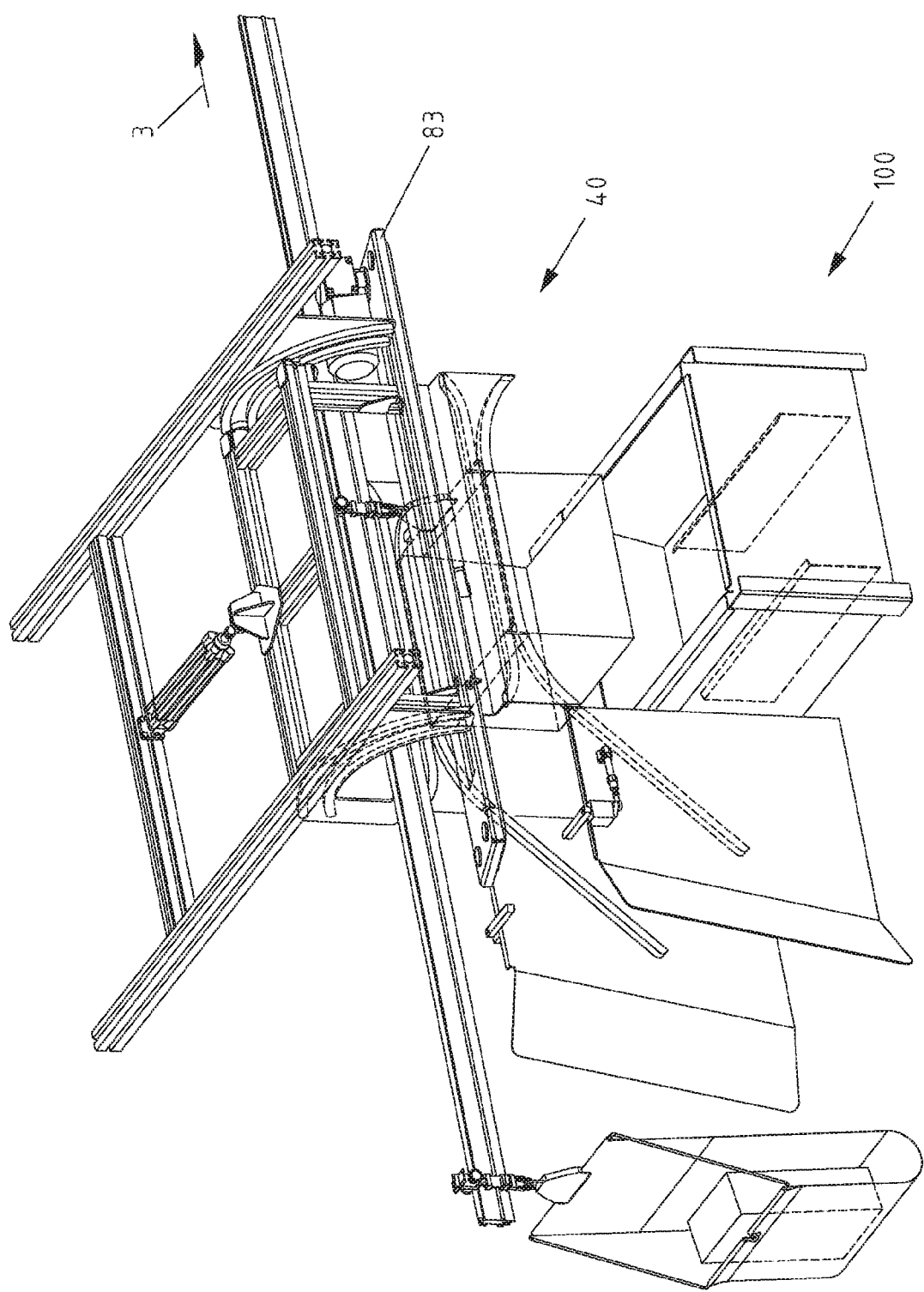
Figure 21B:
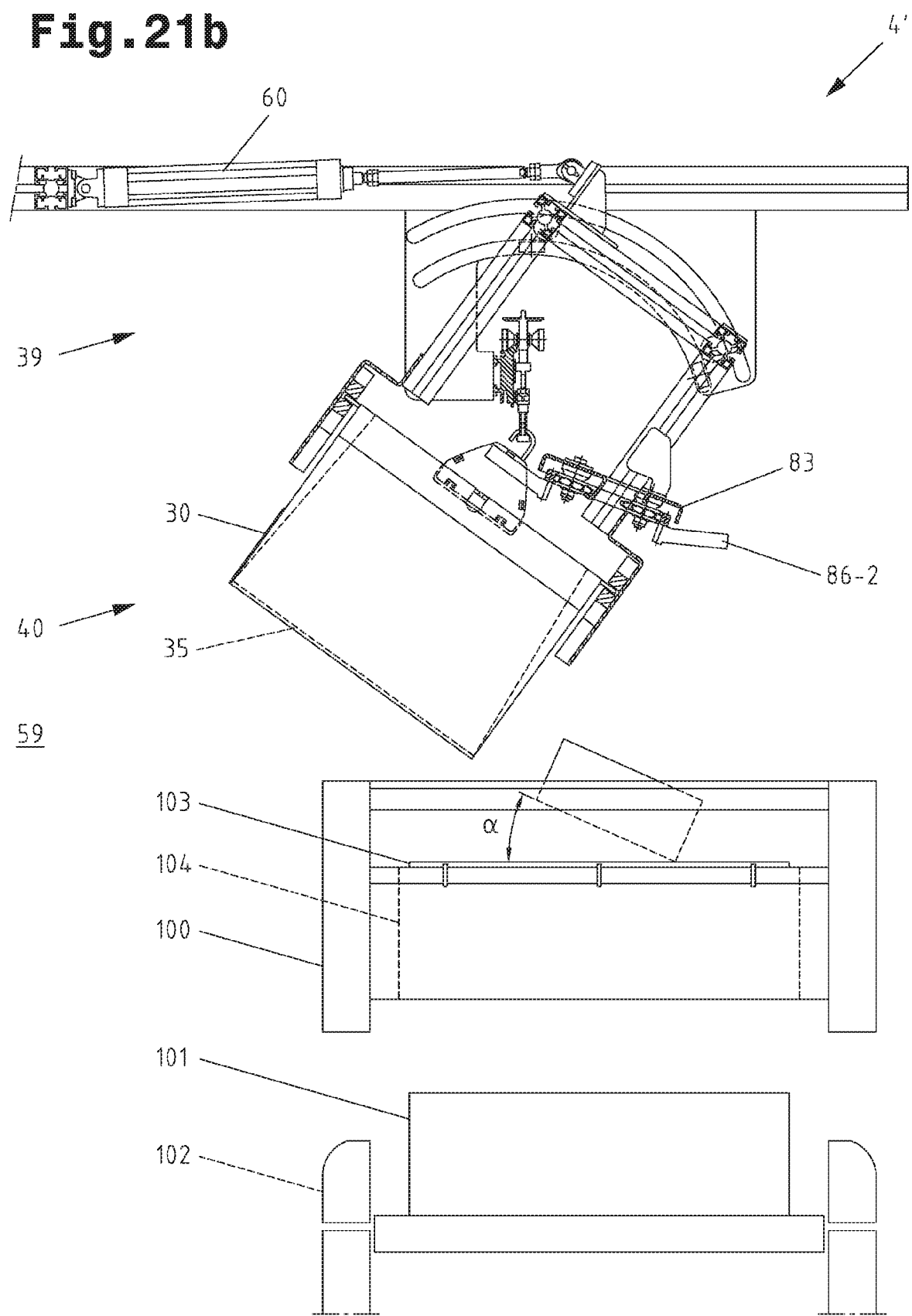
Figure 22:
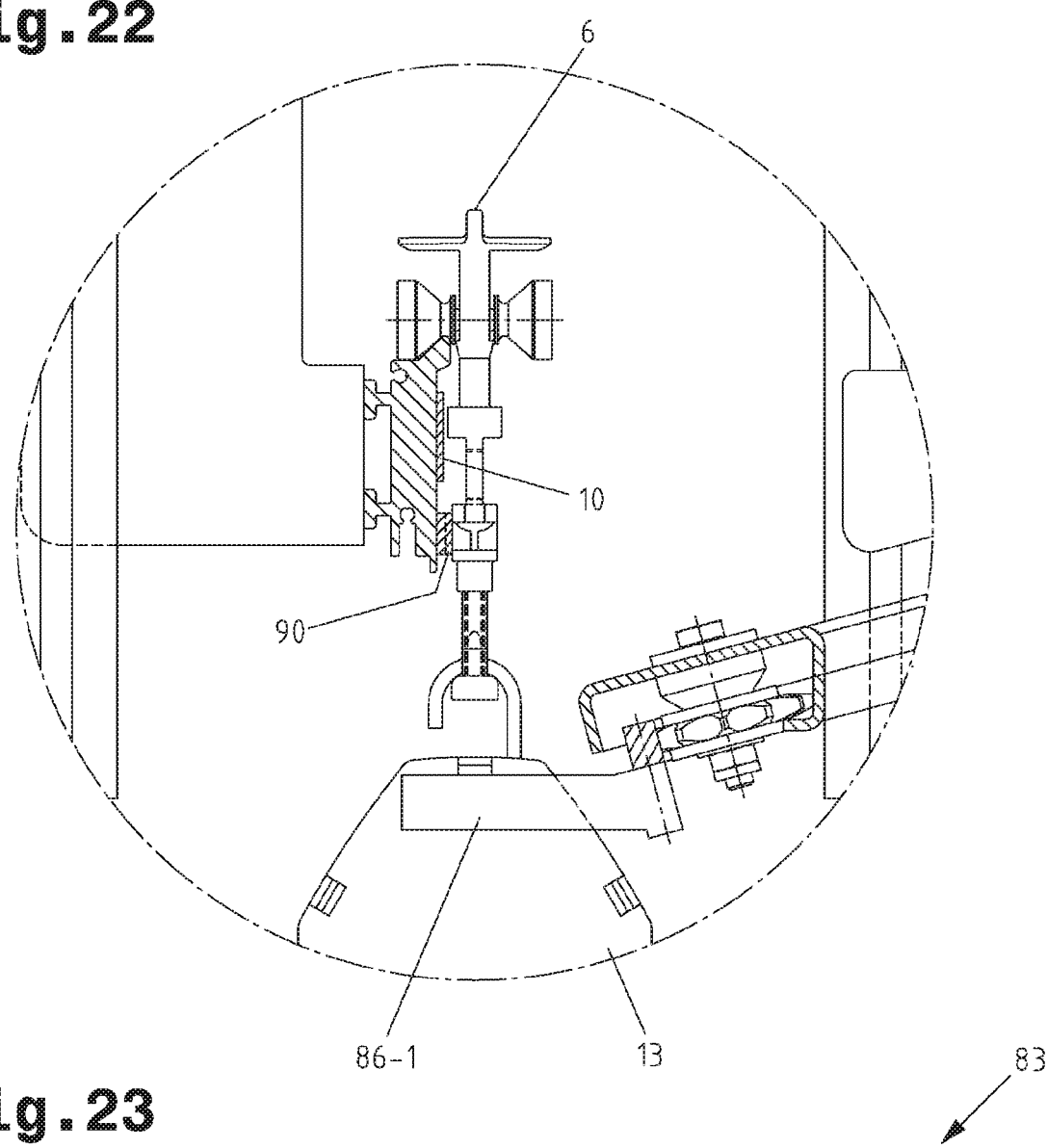
Figure 23:
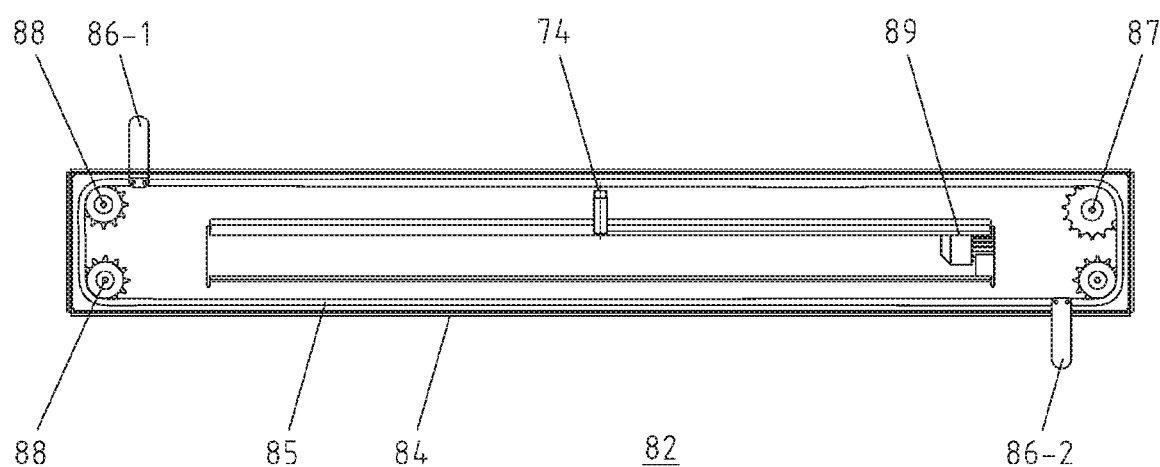

These show in a respectively very simplified schematic representation:

FIGS. 1, 4 to 9 a sequence order of method steps for automated unloading of one of the article containers in an automated unloading station with a first design of an opening and closing device, in perspective views;

FIGS. 2a, 2b a first embodiment of an article container in the closed position and opened position (articles not shown), in perspective views;

FIGS. 3a, 3b a second embodiment of an article container in the closed position and opened position (articles not shown), in perspective views;

FIG. 10 an automated unloading station with a second embodiment of an opening and closing device, in a perspective view;

FIG. 11a an enlarged detail from FIG. 10 with a side view onto the article container and the opening and closing device as well as the bag body in the closed position;

FIG. 11b an enlarged detail from FIG. 10 with a side view onto the article container and the opening and closing device as well as the bag body in the opened position;

FIG. 12a a view onto the unloading device and the article container according to FIG. 5, said article container being in a provisioning position, partially in a sectional view;

FIG. 12b a view onto the unloading device and the article container according to FIG. 6, said article container being in an unloading position, partially in a sectional view;

FIGS. 13 to 20 a sequence order of method steps for automated unloading of one of the article containers in an automated (modified) unloading station with the first design of an opening and closing device, in perspective views;

FIG. 21a a view onto the unloading device and the article container according to FIG. 17, said article container being in a provisioning position, partially in a sectional view;

FIG. 21b a view onto the unloading device and the article container according to FIG. 18, said article container being in an unloading position, partially in a sectional view;

FIG. 21c the article container according to FIG. 21a after unloading and a receiving container for taking over the articles from a filling device;

FIG. 22 an enlarged detail from FIG. 21a;

FIG. 23 a feed drive for the drive device of the transport carriers and/or article containers, in a view from below.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIGS. 1 to 10 show a section of an overhead conveyor system comprising an overhead conveying device 1 for transporting article containers 2 in a transport direction 3 and an unloading station 4 for automated unloading of one of the article containers 2 (transport bag and/or overhead bag).

In concrete terms, the overhead conveying device 1 is provided for transporting the article containers 2 into the unloading station 4 and for transporting the article containers 2 out of the unloading station 4. It includes transport carriers 6 which can be moved along the overhead conveying device 1 by means of a drive device 5.

In the shown exemplary embodiment, the transport carriers 6 are moved by means of a frictional drive (drive device 5). The shown transport carrier 6 comprises a suspended body 7, a (first) roller 8 rotatably mounted on an axle and a friction surface 9, the latter of which can be brought into frictional contact with an endlessly revolving friction belt 10 of the overhead conveying device 1. The (second) roller 8 shown in the FIGS. is optional and serves for guiding the transport carrier 6 at a switching point. The transport carrier 6 is guided on a profile rail 11 of the overhead conveying device 1 via the (first) roller 8 and can be moved into the transport direction 3 by the friction drive. Accordingly, the profile rail 11 forms a guide device for the (driven or non-driven) transport carriers 6. Such a transport carrier 6 is for example described in DE 10 2011 080 280 A1, wherein the shown embodiment of the transport carrier in DE 10 2011 080 280 A1 is different in that the suspended body 7 comprises a pivotal mounting.

According to an embodiment which is not shown, the transport carriers 6 can be moved by means of a positive engagement drive (drive device 5). For this purpose, an endlessly revolving drive belt of the overhead conveying device 1 can be provided with driver elements protruding thereon, which come into positive locking engagement with the transport carriers 6 or with the suspended supports 13.

A combination of a friction drive and a positive engagement drive is also possible.

The described drive devices 5 are in no way to be understood restrictively, but only show different possibilities of how a driving force is transmitted to the transport carriers 6 in order to move them (so as to be driven) on the overhead conveying device 1 in the transport direction 3.

A design in which the transport carriers 6 comprise a drive device and are moved (so as to be driven) in the transport direction 3 on the overhead conveying device 1 is also conceivable.

Independently thereof, a transport movement of the transport carriers 6 without a drive device would also be possible in that the transport carriers 6 are moved (non-driven) by gravity in the transport direction 3 on the overhead conveying device 1.

As can be seen from FIGS. 1, 2a, 2b, 3a, 3b, the article container 2 in a preferred embodiment comprises a suspended support 13, wherein the suspended support 13 and the transport carrier 6 are coupled with one another in an articulated manner via a hinged connection such that the suspended support 13 is pivotable relative to the transport carrier 6 about an axis 14 extending essentially in parallel to the overhead conveying device 1 (and/or essentially in parallel to the transport direction 3).

The transport carrier 6 can be provided with a first coupling element 15 and the suspended support 13 can be provided with a second coupling element 16, wherein the first coupling element 15 and the second coupling element 16 can be coupled and form the hinged connection. The first coupling element 15 comprises a pivotal mounting 17 and the second coupling element 16 comprises a pivot bearing axle 18. The pivot bearing axle 18 is formed on a hook.

According to another embodiment which is not shown, the hinged connection between the suspended support 13 and the transport carrier 6 comprises an elastic body, in particular of an elastomer material, which is connected to the suspended support 13 on the one hand and to the transport carrier 6 on the other hand. The suspended support 13 and the transport carrier 6 are connected to one another via the elastic body (the elastic hinged connection) preferably permanently and/or unreleasably.

FIGS. 2*a*, 2*b* show a first embodiment of an article container 2 for transporting an article 28 (FIG. 1), said article container 2 having a frame 20 and a bag body mounted on the frame 20. The frame 20 forms cross struts 21 extending in parallel at a mutual distance and longitudinal struts 22 extending between the cross struts 21 in parallel at a mutual distance. The frame 20 forms an essentially rectangular or an essentially square outer contour. Preferably, a circumferential wire frame is used as the frame 20.

The article container 2 can also comprise the suspended support 13 for suspended transport on the overhead conveying device 1, which suspended support 13 is equipped with a receptacle 23 for bearing the frame 20. The frame 20 is mounted on the suspended support 13 in the receptacle 23 with one of the cross struts 21 so as to be pivotable relative to the suspended support 13 about a longitudinal axis 24 of the receptacle 23. The suspended support 13 according to the shown embodiment is equipped with the second coupling element 16, for example a suspension element (hook). The article container 2 can be suspended either on the transport carrier 6 or, according to an embodiment not shown, on the overhead conveying device 1 via the suspended support 13.

The bag body forms a front wall 25 and a rear wall 26. A storage space 27 is bounded by the front wall 25 and the rear wall 26. The front wall 25 is mounted on the first cross strut 21 with its end in an articulated manner and the rear wall 26 is mounted on the second cross strut 21 with its end in an articulated manner. The ends of the front wall 25 and the rear wall 26 in each case hanging downwards from the frame 20 are preferably connected to one another integrally or formed as a single piece, such that the front wall 25 and the rear wall 26 merge directly into one another.

The bag body on one of the side walls comprises an unloading opening 29 formed at least in some sections between the front and the rear walls 25, 26, through which unloading opening 29 an article 28 can be discharged from the article container 2 (FIG. 6).

The bag body can comprise a side wall stop 30 arranged at least in some sections between the front and rear wall 25, 26 on one of the side walls opposite to the unloading opening 29, against which side wall stop 30 the article 28 can be placed and to prevent the article 28 from laterally falling out of the article container 2.

As can be seen in FIGS. 1, 2*a*, 2*b*, 3*a*, 3*b*, 5, the bag body can be adjusted between a closed position (transport position) and an opened position by pivoting the frame 20. In the closed position, the storage space 27 is minimized in volume (for example FIG. 1—right article containers 2 before unloading) and the article 28 is transported by means of the article container 2. In the opened position, the storage space 27 is maximized in volume (for example FIGS. 5, 6—article container 2 during unloading) and the article 28 is discharged from the article container 2 through the unloading opening 29.

Since the front wall and rear wall 25, 26 are mounted on the frame 20 in an articulated manner, by the inclined position of the frame 20, a horizontal distance at least between the upper ends of the front and rear wall 25, 26 is changed.

In the closed position, the horizontal distance is smaller than the corresponding horizontal distance in the opened position. The horizontal distance is reduced to a minimum and results from the geometry/dimensions of the article 28, which is accommodated (stored) in the storage space 27 for transport. The storage space 27 (transport space) between the front wall and rear wall 25, 26 becomes smaller, such that the article 28 is reliably held in the storage space 27 by the front wall and rear wall 25, 26. Moreover, a comparatively space-saving transport on the overhead conveying device 1 is made possible.

In the opened position, the horizontal distance is larger than the corresponding horizontal distance in the closed position. The horizontal distance is preferably enlarged to a maximum in order to reliably unload the article 28 from the storage space 27.

Preferably, depending on the geometry/dimensions of the article 28, the bag body is always adjusted into the same opened position which allows for a particularly simple structure of the unloading station 4.

At this point, it should be noted that different articles 28 varying in their geometry/dimensions can be transported by means of the article container 2. The articles 28 are for example cardboard boxes, foil bags (so-called "polybags") made from polyethylene or polypropanol or the like. Such foil bags are predominantly used in the textile industry and are for example used for packaging T-shirts, shirts and the like.

The front wall 25 and the rear wall 26 of the bag body are preferably made from a flexible material. A flexible material can be understood to mean a fabric (textile), a foil, a braid, a knitted fabric, a woven fabric and/or similar. By means of the suspended flexible material a very light and flexible-use article container can be 2 provided.

The article 28 can be held, in particular clamped, between the front and rear walls 25, 26, especially in the closed position, by the flexible material.

The flexible material is preferably supple and can, if applicable, have elastic properties. In this way the article can be surrounded at least in some regions, for example at corners and edges, in a tight-fitting manner by the flexible material. In this way a form and/or friction fit for holding the article 28 within the bag body can be caused. The form and/or friction fit can be intensified by a gravity of the article 28, wherein an autoinhibition can occur.

FIGS. 3*a*, 3*b* show a second embodiment of an article container 2 for transporting an article 28 which differs from the first embodiment by the bag body. It comprises a frame 20 and a bag body mounted on the frame 20. The frame 20 again forms cross struts 21 extending in parallel at a mutual distance and longitudinal struts 22 extending between the cross struts 21 in parallel at a mutual distance. The frame 20 forms an essentially rectangular or an essentially square outer contour. Preferably, a circumferential wire frame is used as the frame 20.

The bag body comprises the front wall 25, the rear wall 26 and a bottom 35. The front wall 25 and the rear wall 26 of the bag body comprise a flexible material, wherein the flexible material is formed at least partially stiffened, in particular planked, on the inside or outside in the region of the front wall 25 and/or in the region of the rear wall 26. Thus, the front wall 25 is divided into a first front wall section (which is located further away from the first cross strut 21 than the second front wall section) and a second front wall section (which is located closer to the first cross strut 21 than the first front wall section), wherein the front wall 25 is formed to be stiffer in the first front wall section than in the second front wall section. The rear wall 26 is divided into a first rear wall section (which is located further away from the second cross strut 21 than the second rear wall section) and a second rear wall section (which is located closer to the second cross strut 21 than the first rear wall section), wherein the rear wall 26 is formed to be stiffer in the second rear wall section than in the first rear wall section. The first rear wall section and the first front wall section are arranged adjacent to one another.

In particular, the front wall 25 has a planking which forms the bottom 35 when the bag body is adjusted into the opened position. The first front wall section defines the bottom 35. The planking is applied to the front wall 25, for example sewn or glued on. Accordingly, the planking serves as a stiffener of the flexible material when the bag body is adjusted into the closed position and as a "chute" when the bag body is adjusted into the open position.

Instead of a planking, the front wall 25 can also form a reinforcement area in which the front wall 25 has a greater material thickness and/or a higher density. This reinforcement area forms the bottom 35 when the bag body is adjusted into the opened position. According to this embodiment, the front wall 25 forms the bottom 35.

In other words, according to both embodiments (first embodiment—the bottom is formed by a planking and second embodiment—the bottom is formed by the front wall), the front wall 25 is to be provided with the bottom 35.

The detailed design of an exemplary article container 2 is described in the Austrian patent application AT 50059/2019 and is made a subject matter of the present disclosure.

Further, a planking 34, which can optionally be provided and which in this exemplary embodiment serves for stiffening the rear wall 26, can be seen in the second rear wall section. The planking is applied to the rear wall 26, for example sewn or glued on. Accordingly, the planking serves as a stiffener of the flexible material when the bag body is adjusted into the closed position.

Instead of a planking, the rear wall 26 can also form a reinforcement area in which the rear wall 26 has a greater material thickness and/or a higher density.

Moreover, it is conceivable that the bottom 35 comprises a holding surface 36 ending in the unloading opening 36, said holding surface 36 fostering unloading of the article 28. The holding surface 36 can optionally define a sliding surface. The article 28 can be stored on the holding surface 36.

The bottom 35 forms a first longitudinal edge 37a, a second longitudinal edge 37b extending at a distance from the first longitudinal edge 37a, a first end edge 38a extending between the first longitudinal edge 37a and the second longitudinal edge 37b, a second end edge 38b extending between the first longitudinal edge 37a and the second longitudinal edge 37b. The unloading opening 29 is bounded by the front wall 25 and the rear wall 26 and abuts on the first end edge 38a in the opened position of the bag body.

The first longitudinal edge 37a forms a first folding edge and the second longitudinal edge 37b forms a second folding edge. When the bag body is adjusted into the opened position, the front wall 25 with the second front wall section connects to the first longitudinal edge 37a and the rear wall 26 with the first rear wall section connects to the second longitudinal edge 37a.

As can be seen from FIG. 3b, the bag body can have a side wall stop 30 abutting on the second end edge 38b, against which the article 28 can be placed.

The storage space 27 of the bag body is bounded by the front wall 25 and the rear wall 26. Likewise, the front wall 25 with its end is mounted on the first longitudinal side 22 in an articulated manner (first pivot bearing) and the rear will 26 with its end is mounted on the second longitudinal side 22 (second pivot bearing) in an articulated manner. It can be seen that by means of the first pivot bearing, the second pivot bearing, the first folding edge and the second folding edge a four-bar linkage is formed, whereby the bag body can be adjusted between the closed position and the opened position particularly easily.

The ends of the front wall 25 and the rear wall 26 in each case hanging downwards from the frame 20 are preferably connected to one another integrally or formed as a single piece, such that the front wall 25 and the rear wall 26 merge directly into one another.

The bag body on one of the side walls comprises the unloading opening 29 formed at least in some sections between the front and the rear walls 25, 26, through which unloading opening 29 an article 28 can be discharged from the article container 2.

The article container 2 can also comprise the suspended support 13 for suspended transport on the overhead conveying device 1, which suspended support 13 is equipped with a receptacle 23 for bearing the frame 20, as described above.

As can be seen in FIGS. 3a, 3b, the bag body can be adjusted between the closed position and the opened position by pivoting the frame 20. In the closed position, the storage space 27 is minimized in volume and the article 28 is transported by means of the article container 2. In the opened position, the storage space 27 is maximized in volume and the article 28 is discharged from the article container 2 through the unloading opening 29.

Since the front wall and rear wall 25, 26 are mounted on the frame 20 in an articulated manner, by the inclined position of the frame 20, a horizontal distance at least between the upper ends of the front and rear wall 25, 26 is changed, as described above.

FIGS. 1, 12a and 12b show the unloading station 4 in different views. It comprises the overhead conveying device 1 for transporting the article container 2 into the unloading station 4 and for transporting the article container 2 out of the unloading station 4, a (first embodiment of an) opening and closing device 40 for adjusting the bag body between the closed position and the opened position and an unloading station 39 for unloading the bag body adjusted into the opened position.

The opening and closing device 40 comprises an actuation device for automatic opening and closing of the bag body, by means of which actuation device the frame 20 can be pivoted about the longitudinal axis 24 relative to the suspended support 13 such that the bag body can be adjusted between the closed position and the opened position.

According to a first embodiment, the actuation device comprises a driver mechanism for automated opening and closing of the bag body. The driver mechanism preferably comprises a first driver mechanism 41 and a second driver mechanism 42 which are arranged on both sides and below the overhead conveying device 1 for transporting the article container 2 into the unloading station 4 and transporting the article container 2 out of the unloading station 4. In particular, the first driver mechanism 41 and the second driver mechanism 42 are arranged symmetrically to one another with respect to the article container 2, in particular the frame 20. However, in general, only one of the driver mechanisms 41 can be provided.

The first driver mechanism 41 is affixed to a first support frame 43 and the second driver mechanism 42 is affixed to a second support frame 44. The first support frame 43 and the second support frame 44 are parts of the actuation device.

In the shown exemplary embodiment, the first driver mechanism 41 comprises a lower guide assembly and an upper guide assembly, the second driver mechanism 42 also comprises a lower guide assembly and an upper guide assembly. The lower guide assembly and the upper guide assembly are arranged on top of one another at a distance such that between the lower guide assembly and the upper guide assembly of the first driver mechanism 41 and between the lower guide assembly and the upper guide assembly of the second driver mechanism 42, in each case, one of the longitudinal struts 22 can be accommodated. The distance essentially corresponds to the diameter of the longitudinal strut 22. However, the first driver mechanism 41 and/or the second driver mechanism 42 can also comprise just the lower guide track. The lower guide assembly and, if provided, the upper guide assembly of the first driver mechanism 41 and, if provided, of the second driver mechanism 42 comprise an inlet section 45 located upstream of the article container 2 in the transport direction 3, an outlet section 46 located downstream thereof, and an unloading section 47 located between the inlet section 45 and the outlet section 46. The lower guide assembly and, if provided, the upper guide assembly of the first driver mechanism 41 and/or of the second driver mechanism 42 extend in parallel to the transport direction 3 of the article container 2.

The inlet section 45 forms a tilted guide track 48 that can be brought into an abutting contact with the frame 20, in particular the longitudinal struts 22, such that the frame 20 is pivoted during transport of the article container 2 into the unloading station 4, whereby the bag body is adjusted from the closed position in the direction of the opened position (FIG. 4).

The unloading section 47 forms a guide track 49 which is essentially horizontal and which can be brought into an abutting contact with the frame 20, in particular the longitudinal struts 22, such that the frame 20 is held in the pivoted deflection position during the unloading operation whereby the bag body also remains in the opened position (FIG. 5).

Figure 8:
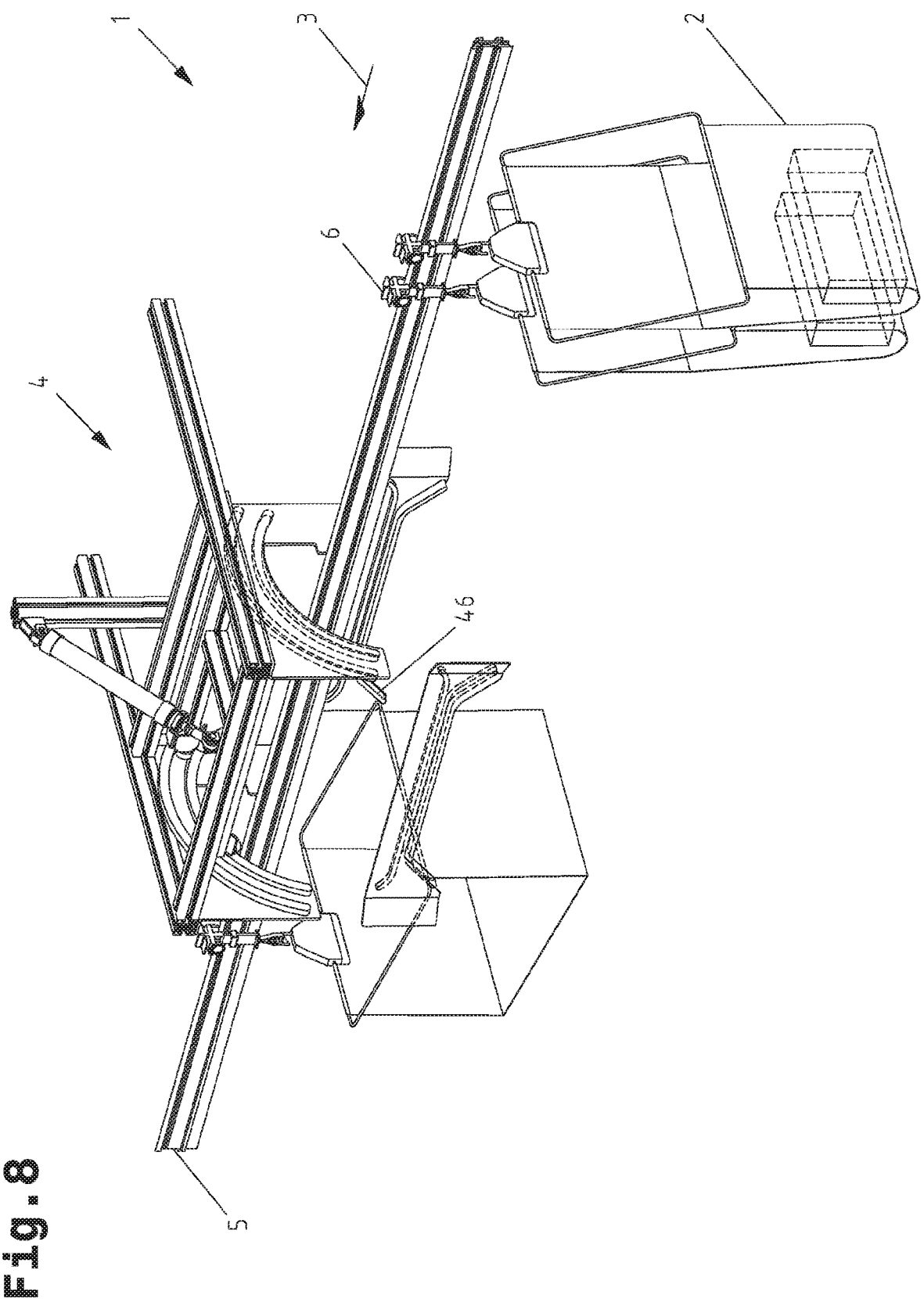

The outlet section 46 forms a tilted guide track 50 that can be brought into an abutting contact with the frame 20, in particular the longitudinal struts 22, such that the frame 20 is pivoted during transport of the article container 2 out of the unloading station 4, whereby the bag body is adjusted from the opened position in the direction of the closed position (FIG. 8).

In general, according to another embodiment (which is not shown), the outlet section 46 could form a guide track 49 which is essentially horizontal and can be brought into an abutting contact with the frame 20, in particular the longitudinal struts 22, such that the frame 20 is pivoted "abruptly" during the transport of the article container 2 out of the unloading station 4 and after leaving the outlet section 46. Hence, the bag body can be adjusted from the opened position in the direction of the closed position very quickly and the unloading cycle can be accelerated.

FIGS. 10, 11a and 11b show the unloading station 4 with the overhead conveying device 1 for transporting the article container 2 into the unloading station 4 and for transporting the article container 2 out of the unloading station 4, the unloading device 39 for unloading the bag body adjusted into the opened position and a (second embodiment of an) opening and closing device 53 for adjusting the bag body between the closed position and the opened position.

According to a second embodiment of the actuation device, the opening and closing device 53 for automated opening and closing of the bag body comprises at least one opening flap 52 movable between a first flap position (FIG. 11a) and a second flap position (FIG. 11b) by means of a drive 51 (see FIGS. 11a, 11b) for adjusting the bag body between the closed position and the opened position.

As can be seen in FIG. 11b, the article container 2 is already pivoted into its opened position. To that end an opening flap 52 is pivoted about an angle starting from a position shown in FIG. 11a into another position shown in FIG. 11b.

The actuating and/or pivoting of the opening flap 52 between a first flap position and a second flap position is done by means of a drive 51. In the first flap position (FIG. 11a) the bag body is in the closed position. In the second flap position (FIG. 11b) the bag body is in the opened position. The drive 51 can be a stepper motor and/or any other drive. The drive 51 and the opening flap 52 are parts of an opening and closing device 53 for adjusting the bag body between a closed position (FIG. 11a) and an opened position (FIG. 11b).

The actuation device and/or opening flap 52 for opening the article container 2 moves the frame 20 between an initial position and a deviation position. In the initial position, depending on the load, the frame 20 is disposed approximately vertical to oblique and in the deviation position approximately horizontal.

The opening flap 52 comprises a guide crosspiece and/or guide surface 54. In the illustration of FIG. 11a, i.e. in the closed position of the bag body, the latter is located in front of the folded-down frame 20. In the illustration according to FIG. 11b, i.e. in the opened position of the bag body, the frame 20 is located between the guide crosspiece 54 and a guide profile 55.

Depending on the driving torque of the drive 51, it is possible that the frame 20 with the longitudinal struts 21 is thereby fixed in a friction fit between the guide crosspiece 54 of the opening flap 52 and the guide profile 55. As shown in FIG. 11b, therefore, in the opened position of the bag body, the guide crosspiece 54 rests against the frame 20 and holds the latter in an essentially horizontal position.

As can be seen in FIG. 10, the opening flap comprises a first opening flap 52 and a second opening flap 52 which are synchronously controlled and which are arranged on both sides and below the overhead conveying device 1 for transporting the article container 2 into the unloading station 4 and transporting the article container 2 out of the unloading station 4. In particular, the first opening flap 52 and the second opening flap 52 are arranged symmetrically to one another with respect to the article container 2, in particular the frame 20. In this way, a torsion-free dislocating of the frame 20 can be achieved during opening of the bag body 2. Heavier articles 28 can be loaded into the article container 2. However, in general, only one of the opening flaps 52 can be provided.

The first opening flap 52 is affixed to a first support frame 43 and the second opening flap 52 to a second support frame 44. One guide profile 55 is assigned to each opening flap 52.

As is shown, the guide profiles 55 are arranged on both sides and below the overhead conveying device 1 for transporting the article container 2 into the unloading station 4 and for transporting the article container 2 out of the unloading station 4.

It is also advantageous that, in the second flap position of the opening flap 52, the guide surface 54 extending in the transport direction 3 of the article container 2 serves for guiding the frame 20 during a leaving of the unloading station 4. By means of the guide surface 54, a desired path of motion of the bag body can be achieved during the leaving of the unloading station 4. If applicable, any vibrations and/or oscillations occurring during the acceleration of the article container 2 can be dampened, so that an overall quieter movement and therefore more careful transport of the articles 28 within the article container 2 are possible.

As can be seen in FIGS. 1 through 9, the unloading device 39 comprises an actuation device 56, by means of which the article container 2 with the bag body can be tilted about a tilting axis 57 extending essentially in parallel to the longitudinal extension of the overhead conveying device 1 between a provisioning position 58 (FIGS. 5, 12*a*) and an unloading position 59 (FIGS. 6, 12*b*), wherein in the unloading position 59, the articles 28 can be discharged from the article container 2 through the unloading opening 29. The articles 28 are preferably loaded into a container not depicted or on a conveying device not depicted, for example a belt conveyor. This container can also represent the shipping cardboard box.

In a preferred first embodiment, the article container 2, with the bag body adjusted into the opened position, is tilted about the tilting axis 57 between a provisioning position 58 (FIGS. 5, 12*a*) and a unloading position 59 (FIGS. 6, 12*b*). In other words, the bag body is adjusted into the opened position in a precursory first step i) before the unloading—the article container 2 is now in the provisioning position 58, and in a subsequent second step ii), the article container 2, with the bag body adjusted into the opened position, is pivoted about the tilting axis 57—the article container 2 is now in the unloading position 59.

After the unloading, the article container 2, with the bag body adjusted into the opened position, is tilted back from the unloading position 59 (FIGS. 6, 12*a*) into the provisioning position 58 (FIG. 7) about the tilting axis 57. Afterwards, the article container 2 is transported away by means of the overhead conveying device 1.

As will be further explained in the following with the aid of FIGS. 12*a*, 12*b*, the unloading station 4 can be provided a locking device 70 for arresting the transport carrier 6 during an unloading operation of the article container 2. The arresting of the transport carrier 6 takes place after the article container 2 has reached the provisioning position 58.

According to a second embodiment, the article container 2 is tilted, still during the adjustment movement of the bag body between the closed position and the opened position, about the tilting axis 57 between the provisioning position 58 and the unloading position 59. In other words, for unloading, the article container 2 is tilted from the provisioning position 58 into the unloading position 59 about the tilting axis 57 for unloading, still during the opening operation of the bag body from the closed position in the direction of the opened position. Likewise, the article container 2 can be tilted from the unloading position 59 into the provisioning position 58 about the tilting axis 57 after the unloading and during the closing operation of the bag body from the opened position in the direction of the closed position.

The actuation device 56 of the unloading device 39 comprises a frame structure 61 which can be tilted by means of a drive 60 between an initial position and an actuation position about an axis extending in parallel to the transport direction 3 of the article containers 2. The drive 60 is for example a fluid cylinder.

In the depicted embodiment, the frame structure 61 is mounted on a stationary support construction 63 via guide assemblies 62. Each of the guide assemblies 62 comprises a guide track 64 and guide rollers 65, 66 (FIGS. 1, 12*a*) which rest thereon in a rollable manner. The guide tracks comprise the (left) first guide track 64 and the (right) second guide track 64. The first guide track 64 is affixed to a first support frame 67 and the second guide track 64 to a second support frame 68. The frame structure 61 has frame sides opposing one another, wherein the guide rollers 65, 66 are arranged on the first frame side and the guide rollers 65, 66 are arranged on the second frame side.

As is shown in dashed lines exclusively in FIG. 12*b* for reasons of clarity, the actuation device of the opening and closing device 40, 53 is mounted on the tiltable frame structure 61.

Specifically, the first driver mechanism 41 with the first support frame 43 and the second driver mechanism 42 with the second support frame 44 according to the first embodiment, or the first opening flap 52 with the first support frame 43 and the second opening flap 52 with the second support frame 44 according to the second embodiment is affixed to the frame structure 61 by means of frame connections 69.

Hence, the opening and closing device 40, 53 is tilted together with the frame structure 61, and the article container 2 is held substantially fixed also in the unloading position 59 (between the lower guide assembly and the upper guide assembly of the first driver mechanism 41 and, if available, between the lower guide assembly and the upper guide assembly of the second driver mechanism 42, one of the longitudinal struts 22 each according to the first embodiment, or between the first opening flap 52 and the first guide profile 55 and, if available, between the second opening flap 52 and the second guide profile 55).

In FIGS. 12*a*, 12*b*, the unloading station 4 is shown with the first embodiment of the opening and closing device 40. In FIG. 12*a*, the article container 2 is in the provisioning position 58 and the bag body in its opened position (also see FIG. 5). In FIG. 12*b*, the article container 2 is in the unloading position 59 and the bag body in its opened position (also see FIG. 6).

According to this embodiment, the unloading station 4 additionally comprises a locking device 70 for arresting the transport carrier 6 during an unloading operation of the article container 2.

The locking device 70 comprises an arresting element 72, for arresting the transport carrier 6, movable between an ineffective initial position (12*a*) and an effective actuation position (FIG. 12*b*) by means of a drive 71. The arresting element 72 comprises, for example, a stop, against which a profile crosspiece 73 of the transport carrier 6 runs and positions the transport carrier 6 in the transport direction 3. The locking of the transport carrier 6 takes place when the article container 2 was stopped and has reached the provisioning position 58. The provisioning position 58 is monitored by a sensor system 74, for example a proximity sensor.

The unloading station 4 can further comprise a guide device 75 extending in parallel to the transport direction 3 for laterally guiding the transport carrier 6 during a transport movement of the transport carrier 6 with the overhead conveying device 1 for transporting the article container 2 into the unloading station 4 and transporting the article container 2 out of the unloading station 4. Moreover, the guide device 75 is effective during the unloading operation and when the article container 2 is tilted between the provisioning position 58 and unloading position 59 about the tilting axis 57, by means of the transport carrier 6 being fixed against a lateral movement (transversely with respect to the transport direction 3) and/or a lateral movement (transversely with respect to the transport direction 3) being limited.

As exclusively recorded in the FIGS. 12*a*, 12*b*, a receiving profile 76 extending parallel to the transport direction 3 is provided in the unloading station 4, on which receiving profile 76 the guide device 75 and/or the sensor system 74 and/or a pressing unit 77 are mounted. As described above, a friction drive (drive device 5) can be used for driving the transport carriers 6. In this case, it can prove advantageous if the pressing unit 77 presses the transport carrier 6 against the friction belt 10 by means of a pressing means which is acted upon by a spring force. In this case, the arresting element 72, when in the actuating position, can lift the transport carrier 6 off the friction belt 10 with the aid of an unlocking force effective against the spring force, so that the article container 2 remains in the provisioning position 58 and is not acted upon by a driving force. However, explicit reference is made to the fact that such a pressing unit 77 can also be omitted.

FIGS. 1, 4 through 9 serve for description of the method for unloading articles 28 out of an article container 2. The article containers 2 can be backed up one after the other in the transport direction 3 in front of the unloading station 4 (FIG. 1) and afterwards, be separated by means of a separation device not depicted, before one of the article containers 2 is transported into the unloading station 4.

In the unloading station 4, the bag body is adjusted, in a step i), out of the closed position into the opened position by means of the opening and closing device 40.

The article container 2 is moved in the transport direction 3 by means of the overhead conveying device 1, and at the unloading station 4, the frame 20 contacts the inlet section 45, so that the frame 20 is pivoted by the transport movement, such that the bag body is adjusted out of the closed position in the direction of the opened position (FIG. 4).

Due to the continuous transport movement of the article container 2, the frame 20 reaches the unloading section 47 and, in doing so, is pivoted such that the bag body is completely adjusted into the opened position and is held in the opened position (FIG. 5).

Then, the article container 2 is briefly stopped. In the stopped position, the article container 2 adjusted into the opened position is in the provisioning position 58 (FIGS. 5, 12*a*).

In a step ii), the article container 2 with the bag body (according to this embodiment) adjusted into the opened position is tilted, by means of the unloading device 39, out of the provisioning position 58 into the unloading position 59 about the longitudinal axis 57 extending substantially parallel to the longitudinal extension of the overhead conveying device 1, whereby the articles 28 are discharged, in particular ejected, through the unloading opening 29 out of the article container 2 (FIGS. 6, 12*b*). In case the locking device 70 is provided, the transport carrier 6 can be arrested during the unloading operation of the article container 2.

Figure 7:
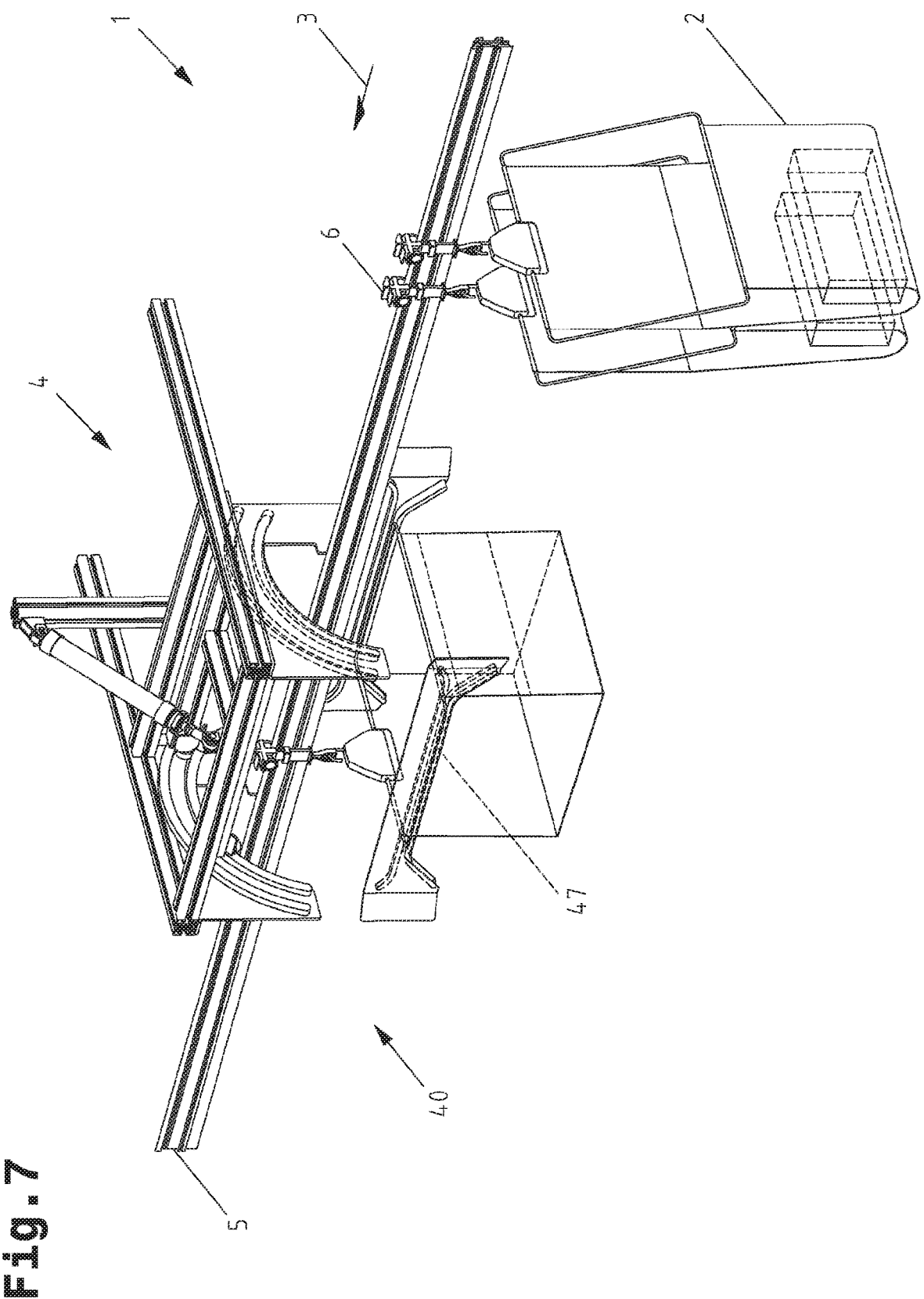

After the unloading operation (discharging operation), the article container 2, with the bag body adjusted into the opened position, is tilted out of the unloading position 59 back into the provisioning position 58 about the longitudinal axis 57 by means of the unloading device 39 (FIGS. 7, 12*a*). In case the locking device 70 is provided, the transport carrier 6 can be arrested even while the article container 2 is tilted back (as a step of the unloading operation).

Subsequently the article container 2 is moved in the transport direction 3 by means of the overhead conveying device 1, and the frame 20 contacts the outlet section 46, so that the frame 20 is pivoted by the transport movement, such that the bag body is adjusted out of the opened position in the direction of the closed position (FIG. 8). In case the locking device 70 is provided, the transport carrier 6 is released for the time being in order to allow a transport movement in the transport direction 3 again.

Figure 9:
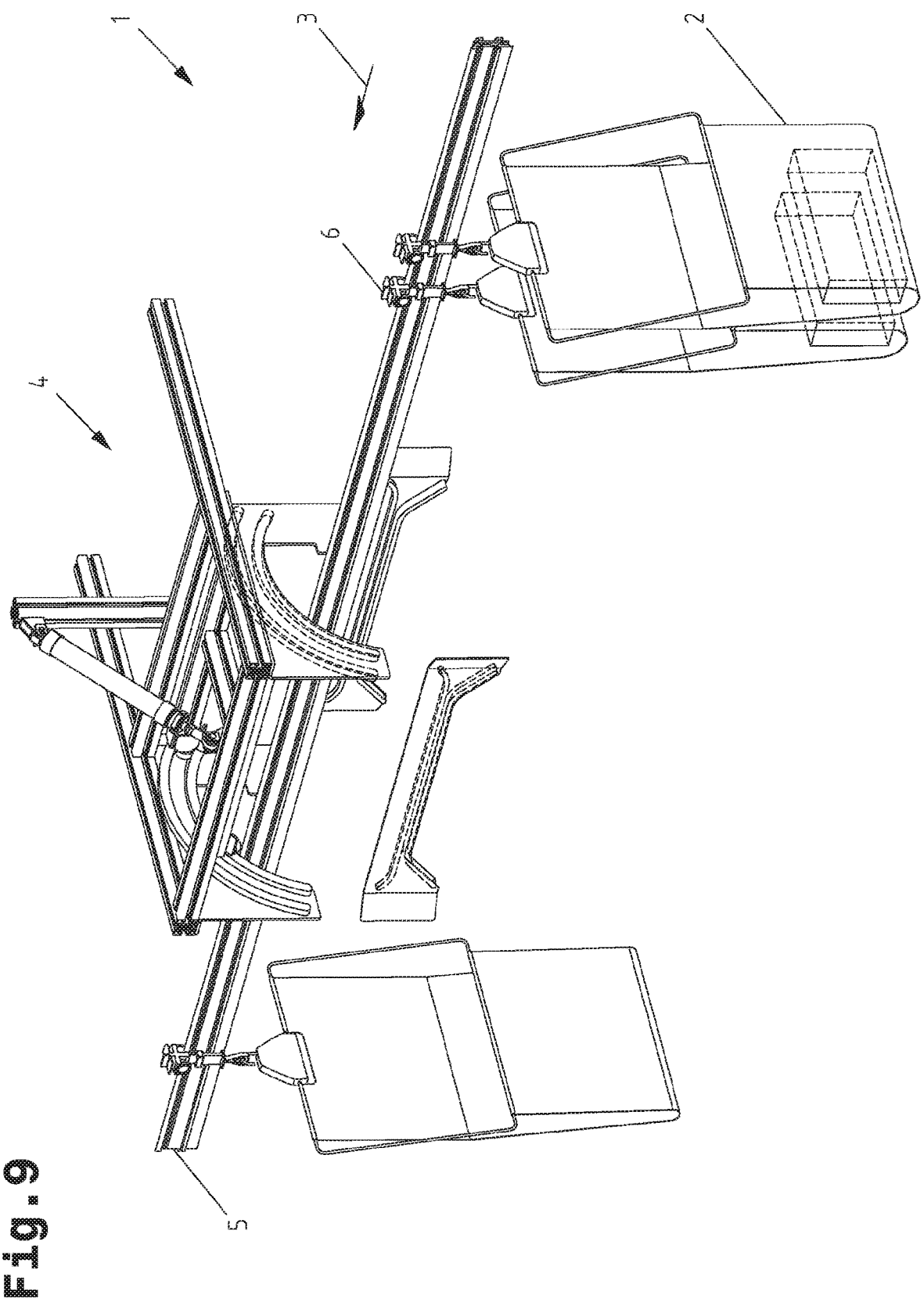

Due to the continued transport movement of the article container 2, it leaves the unloading station 4 in an evacuated or partially evacuated condition (FIG. 9).

According to another embodiment, step i) and step ii) are carried out so as to overlap in time, in that the article container 2 is transported to the unloading station 4 by the overhead conveying device 1 and is continuously moved along the unloading station 4, wherein during the continuous transport movement of the article container 2 in step i) the bag body 2 is adjusted from the closed position into the opened position by the opening and closing device 40, and simultaneously in step ii) the article container 2 with the bag body is tilted about the longitudinal axis 57 extending essentially in parallel to the longitudinal extension of the overhead conveying device 1 from the provisioning position 58 into the unloading position 59 by means of the unloading device 39, whereby the article 28 is discharged from the article container 2 through the unloading opening 29. In this regard, it is possible that while the transport speed varies during the transport movement along the unloading station 4, it is always greater than zero.

In other words, the article container 2 is tilted, still during the adjustment movement of the bag body between the closed position and the opened position, about the tilting axis 57 between the provisioning position 58 and the unloading position 59. In doing so, for unloading, the article container 2 is tilted from the provisioning position 58 into the unloading position 59 about the tilting axis 57 for unloading, still during the opening operation of the bag body from the closed position in the direction of the opened position. Likewise, the article container 2 can be tilted from the unloading position 59 into the provisioning position 58 about the tilting axis 57 after the unloading and during the closing operation of the bag body from the opened position in the direction of the closed position. According to this embodiment, the locking device 70 described above for arresting the transport carrier 6 can be omitted.

FIGS. 13 to 20, 21*a* and 21*c* show a section of an overhead conveyor system comprising the overhead conveying device 1 for transporting article containers 2 in the transport direction 3 and a modified embodiment of an unloading station 4 for automated unloading of one of the article containers 2 (transport bag and/or overhead bag).

The depicted overhead conveying device 1 for transporting the article containers 2 into the unloading station 4' and transporting the article containers 2 out of the unloading station 4' comprises a guide device 81 in various conveying sections 80*a*, 80*b*, 80*c* and transport carriers 6 movable (so as to be driven) along the guide device 81 by means of one of the drive devices 5 described above or a combination of the drive devices 5 described above.

The overhead conveyor system can also comprise a (not depicted) overhead conveying device for transporting article containers 2, which has a guide device 81 and transport carriers 6 movable (not driven) along the guide device 81.

The overhead conveyor system can also comprise exclusively the guide device 81 and transport carriers 6 movable (not driven) by means of the drive device(s) 5 described above along the guide device 81.

Such a transport carrier 6 is described for example in the Austrian patent application AT 50092/2019.

The guide device 81 is formed on the profile rail 11.

In the depicted exemplary embodiment, the transport carriers 6 described above
- are moved in a conveying section 80c arranged along the unloading station 4' by means of a positive engagement drive (drive device) and
- In a conveying section 80a arranged upstream with respect to the conveying section 80c (for supplying the article containers 2) and in a conveying section 80b arranged downstream with respect to the conveying section 80c (for transporting the article containers 2 away) by means of a friction drive (drive device).

On the other hand, the transport carriers 6 can also be moved in the conveying section 80a arranged upstream (for supplying the article containers 2) as well as in the conveying section 80b arranged downstream (for transporting the article containers 2 away) by means of a positive engagement drive (drive device). In this case, a guide slat 90 described below and arranged in the conveying section 80c can be omitted.

The conveying section 80c forms a transport path 82 extending parallel to the longitudinal extension of the overhead conveying device 1 and along the unloading station 4', along which transport path 82 the article containers 2 are transported, in particular separately.

The described drive devices are in no way to be understood restrictively, but only show different possibilities of how a driving force is transmitted to the transport carriers 6 and/or the article containers 2 in order to move them (so as to be driven) on the overhead conveying device 1 in the transport direction 3.

Figure 13:
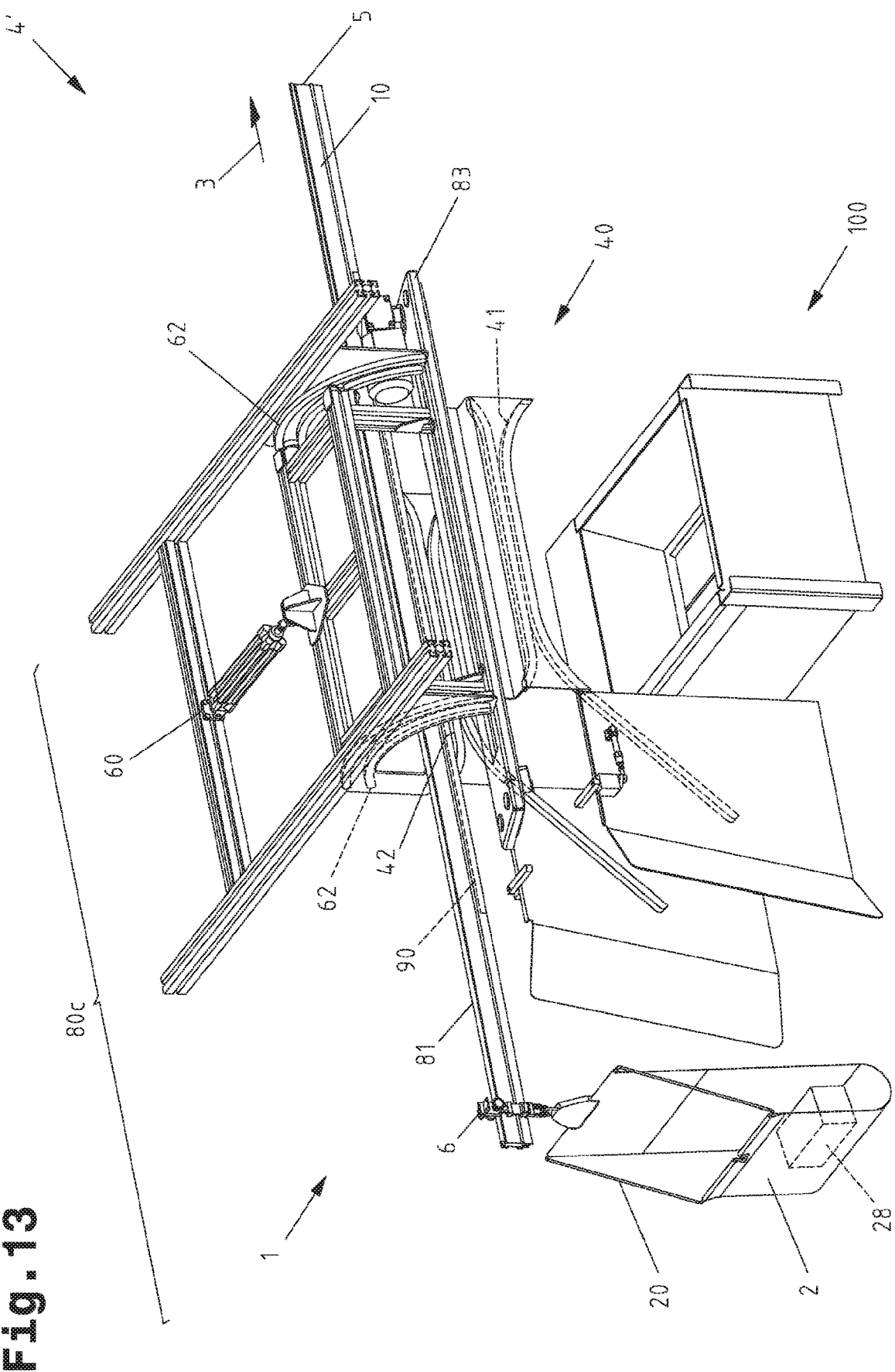

In case the drive device 5 is formed by a friction drive, it proves advantageous if the guide device 81 has guide slat 90 extending parallel to the transport direction 3 in the conveying section 80c, by means of which the transport carrier 6 is lifted off in the vertical direction with respect to and from the friction belt 10, as shown in FIGS. 13 and 22, in particular. This ensures that the article container 2 is moved exclusively by a positive engagement drive in the conveying section 80c and does not engage in a frictional manner with the preferably continuously operated friction belt 10 during the unloading operation of the transport carriers 6, so that the wear on the transport carrier 6 is kept to a minimum. Furthermore, it is advantageous that the transport carrier 6 rests on the guide slat 90 in the provisioning position 58 and unloading position 59 of the article container 2, and therefore the unloading operation can be performed particularly reliably, as can be seen in FIGS. 21a and 21b.

However, if this guide slat 90 in the conveying section 80c is not provided, the article container 2 in the conveying section 80c can principally also be moved by a friction and positive engagement drive.

According to a possible embodiment, the drive device 5 in the conveying section 80c comprises a feed drive 83 as it is introduced in more detail in FIG. 23. The feed drive 83 comprises a support frame 84, a traction drive mounted on the support frame 84 and a driver finger arranged with a traction means 85 for the drive movement of the transport carrier 6 and/or article container 2 along the guide device 81.

The traction drive comprises the traction means 85 which is guided around a drive wheel 87 and deflection wheels 88. The drive wheel 87 is coupled with a drive motor 89. Moreover, the feed drive 83 can comprise a sensor system 74, for example a proximity sensor, by means of which the provisioning position 59 is observed.

The driver finger can be moved between an initial position retracted from the transport path 82 into an engaging position projecting into the transport path 82 by means of the traction drive, wherein the driver finger in the engaging position can be brought into positive locking engagement with the article container 2 and by which the article container 2 can be moved along the conveying section 81c.

Figure 16:
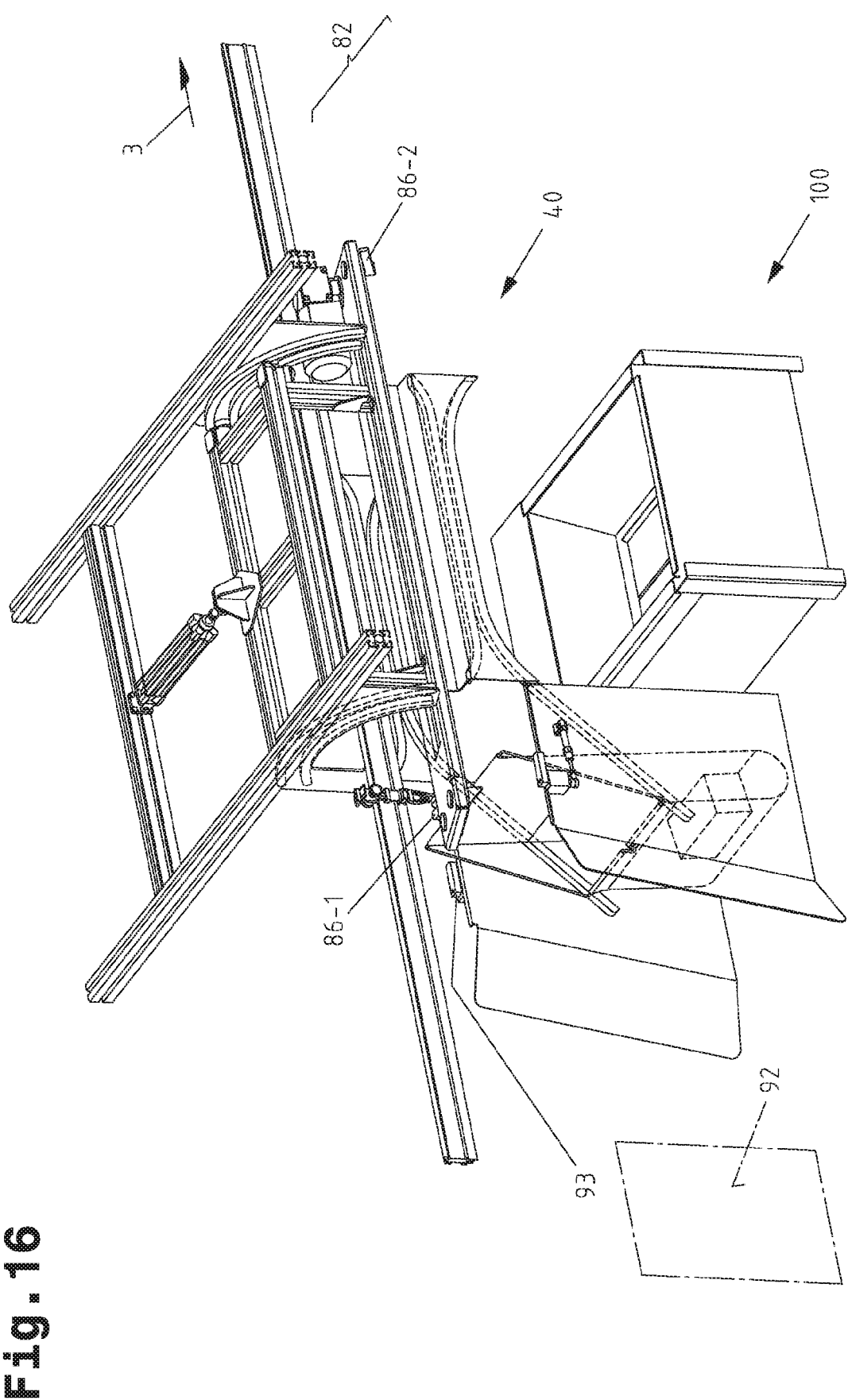

As can be seen in FIGS. 16 and 23, the driver finger can comprise a first driver finger 86-1 and a second driver finger 86-2, which are arranged in the direction of circulation of the traction means 85 at a distance which is determined in such a way that the plurality of driver fingers 86-1, 86-2 are moved alternately into the engaging position, wherein the respective driver finger 86-1, 86-2 in the engaging position can be brought into positive locking engagement with the article container 2 and by means of which the article container 2 can be moved along the conveying section 81c. FIG. 16 shows the driver finger 86-1 in the engaging position and FIG. 23 shows the driver finger 86-1 in the initial position.

The first driver finger 86-1 can be brought into a positive locking engagement with a first article container 2 and moves the first article container 2 along the conveying section 81c, see FIGS. 16 and 17. The second driver finger can be brought into a positive locking engagement with a second article container 2 and moves the second article container 2 along the conveying section 81c. Accordingly, the first article container 2 and the second article container 2 are transported through the conveying section 81c one after the other; however, the second article container 2 can be gripped by means of the second driver finger 86-2 as soon as the first article container 2 has been transported out of the conveying section 81c by means of the first driver finger 86-1.

Although two driver fingers are described according to this embodiment, the number of driver fingers can vary. It is also possible to provide more than two driver fingers. Just a single driver finger is also conceivable as well.

The modified embodiment of the unloading station 4', just as the unloading station 4, comprises the overhead conveying device 1 for transporting the article container 2 into the unloading station 4' and for transporting the article container 2 out of the unloading station 4', the opening and closing device 40; 53 for adjusting the bag body between the closed position and the opened position and the unloading station 39 for unloading the bag body adjusted into the opened position. FIGS. 12 to 20, 21a, 21b and 21c show the first embodiment of the opening and closing device 40. To avoid repetition reference is made to the above disclosure.

The unloading device 39 also corresponds to the explanations above and comprises the actuation device 56, by means of which the article container 2 with the bag body can be tilted about a tilting axis 57 extending essentially in parallel to the longitudinal extension of the overhead conveying device 1 between the provisioning position 58 (FIGS. 17, 21a) and the unloading position 59 (FIGS. 18, 21b), wherein in the unloading position 59, the article 28 can be discharged from the article container 2 through the unloading opening 29. To avoid repetition reference is made to the above disclosure.

The actuation device 56 of the unloading device 39 comprises the frame structure 61 which can be tilted by means of a drive 60 between an initial position and an actuation position about an axis extending in parallel to the transport direction 3 of the article containers 2, as described above. According to the modified embodiment of the unloading station 4', the drive device 5 comprises the feed drive 83 described above, wherein then, the actuation device 41, 42; 52 of the opening and closing device 40; 53 as well as the feed drive 83 are mounted on the frame structure 61.

Hence, the feed drive 83 and the opening and closing device 40, 53 are tilted together with the frame structure 61, and the article container 2 is held substantially fixed also in the unloading position 59 (between the lower guide assembly and the upper guide assembly of the first driver mechanism 41 and, if available, between the lower guide assembly and the upper guide assembly of the second driver mechanism 42, one of the longitudinal struts 22 each according to the first embodiment, or between the first opening flap 52 and the first guide profile 55 and, if available, between the second opening flap 52 and the second guide profile 55).

According to the modified embodiment, the unloading station 4' can comprise an article container positioning device 91 in the conveying section 80c upstream of the opening and closing device 40; 53.

The article container positioning device 91 comprises stopper elements 93 arranged on both sides of the transport path 82 and symmetrically to a vertical plane 92 extending in the direction of the transport path 82. The stopper elements 93 can be moved between a release position retracted from the transport path 82 (FIGS. 15, 16) and an engaging position projecting into the transport path 82 (FIGS. 13, 14) by means of a drive 94.

The stopper elements 93 are designed as stopper fingers or as stopper plates. As can be seen in the figures, the stopper elements 93 are each coupled to a drive 94. The stopper elements 93 can for example each be pivoted about a vertical axis by means of the drive 94. However, the stopper elements 93 can also be designed as stopper plates, which are not shown in more detail, which are perpendicular to the vertical plane 92 and which can be moved towards one another and away from one another by means of drives.

Positioning the article container 2 against the stopper elements 93 can be carried out such that the article container 2 is positioned, with a frame 20 comprising it, with which the bag body can be adjusted between the closed position and the opened position, and/or with a bag body, against the stopper fingers 93 moved into the engaging position.

When the stopper fingers are in the engaging position, an article container 2 (preferably) transported there individually can be positioned against the stopper fingers.

The article container 2 is in the taking-over position (FIG. 14), in which the feed drive 83 described above with the driver finger 86-1 can grip the article container 2 and by means of which the article container 2 can be moved from the taking-over position into a provisioning position 58 provided downstream thereof (FIG. 17). In concrete terms, the transport carrier 6 is driven by the drive device 5 provided in the conveying section 80a and hence the article container 2 is positioned against the stopper elements 93 which are moved into the engaging position. In the shown exemplary embodiment, the transport carrier 6 is driven by means of the endlessly revolving friction belt 10 in the conveying section 80a.

After the unloading operation (tilting back of the article container 2 from the unloading position 59 into the provisioning position 58), the article container 2 can be moved from the provisioning position 58 (FIG. 17) into a taking-over position (FIG. 20) provided downstream thereof, at which the article container 2 reaches the conveying section 80b, by means of the feed drive 83 with the driver finger 86-1 described above. In concrete terms, the transport carrier 6 is driven by the drive device 5 provided in the conveying section 80b and hence article container 2 transported away from the unloading station 4'. In the shown exemplary embodiment, the transport carrier 6 is driven by means of the endlessly revolving friction belt 10 in the conveying section 80b.

At this point, it should be noted that in FIG. 18, for reasons of clarity, the driver fingers 86-1, 86-2 are not shown. In fact, these are in the positions as shown in FIG. 17; however, due to the tilting movement of the feed drive 83 are in a tilted position.

As is not shown in further detail, the unloading station 4' can also comprise the locking device 70 described above for arresting the transport carrier 6 during an unloading operation of the article container 2.

The locking device 70 comprises an arresting element 72, for arresting the transport carrier 6, movable between an ineffective initial position and an effective actuation position by means of a drive 71. The arresting element 72 comprises, for example, a stop against which the transport carrier 6 moved by the feed drive 83 runs and by means of which the transport carrier 6 is positioned in the transport direction 3. The transport carrier 6 is now positioned between the driver finger 86-1 arranged upstream of the transport carrier 6 and the arresting element 72 arranged downstream of the transport carrier 6. The article container 2 is now in the provisioning position 58 (FIG. 17) in which the transport carrier 6 is arrested. The provisioning position 58 is monitored by a sensor system 74 shown in FIG. 23, for example a proximity sensor. In the present context, "arrest" is to be understood such that the transport carrier 6 does not necessarily have to be fixed in the provisioning position 58, but can also be moved to a limited extent between the driver finger 86-1 and the arresting element 72. However, sufficient positioning between the driver finger 86-1 and the arresting element 72 is present and the unloading operation can be carried out reliably also in case of highly dynamic tilting movements.

The article container positioning device 91 can also comprise guide walls 96 arranged on both sides of the transport path 82 and symmetrically to a vertical plane 92 extending in the direction of the transport path 82.

The guide walls 96 form inlet chamfers 97 arranged symmetrically to the vertical plane 92 extending in the direction of the transport path 82 and tapering towards each other in a tilted manner in the direction of the opening and closing device 40; 53.

At least one of the guide walls 96 is provided with a with a driver mechanism 98, wherein the driver mechanism 98 forms a tilted guide track 99 that can be brought into an abutting contact with the frame 20 such that the frame 20 is pivoted during transport of the article container 2 into the opening and closing device 40; 53, whereby the bag body is adjusted from the closed position in the direction of the opened position. However, here, the bag body is not necessarily already fully adjusted into the opened position.

Preferably, the driver mechanism 98 comprises a first driver mechanism and a second driver mechanism, which are arranged on both sides of the transport path 82 and symmetrically to a vertical plane 92 extending in the direction of the transport path 82, and which each form a tilted guide track 99 that can be brought into an abutting contact with the frame 20, as shown in FIG. 16.

The unloading station 4' can additionally comprise a filling device 100 below the unloading position (and/or order-picking position), by means of which filling device 100, in a first step i), the article 28 discharged by the article container 2 is collected and, in a second step ii), the article 28 is discharged to a receiving container 101, in particular see FIGS. 21*a*, 21*b*, 21*c*. The receiving container 101 can for example be formed by a container which is transported into a filling position by means of a conveying device 102 arranged below the filling device 100 (shown exclusively in FIGS. 21*a*, 21*b*, 21*c*) and is transported out of the filling positioned after filling.

The filling device 100 comprises a bottom shelf 103 and a bottom opening 104 that can be opened and closed by the bottom shelf 103. The bottom shelf 103 comprises, for example, bottom parts that can be pivoted in opposite directions about axes aligned transversely to the transport direction 3 (as can well be seen from FIG. 19).

Due to the tilting movement of the article container 2, the article 28 slides on the bottom 35 in the direction towards the unloading opening 29 and then falls onto the bottom shelf 103 of the filling device 100 at an angle "a" of less than 60°, in particular at an angle "a" of between 30° and 45°, in relation to a horizontal plane, as can be seen in FIG. 21*b*. The angle "a" results from the tilting angle of the article container 2 when tilted into the unloading position 59.

Regarding the method for unloading an article 28 from an article container 2, reference is made to the disclosure above. The different method steps are comprehensible from FIGS. 13 to 20, 21*a*, 21*b* and 21*c*.

As opposed to the method described above, here, an additional method step is provided, which can also be applied in the unloading station 4.

Figure 14:
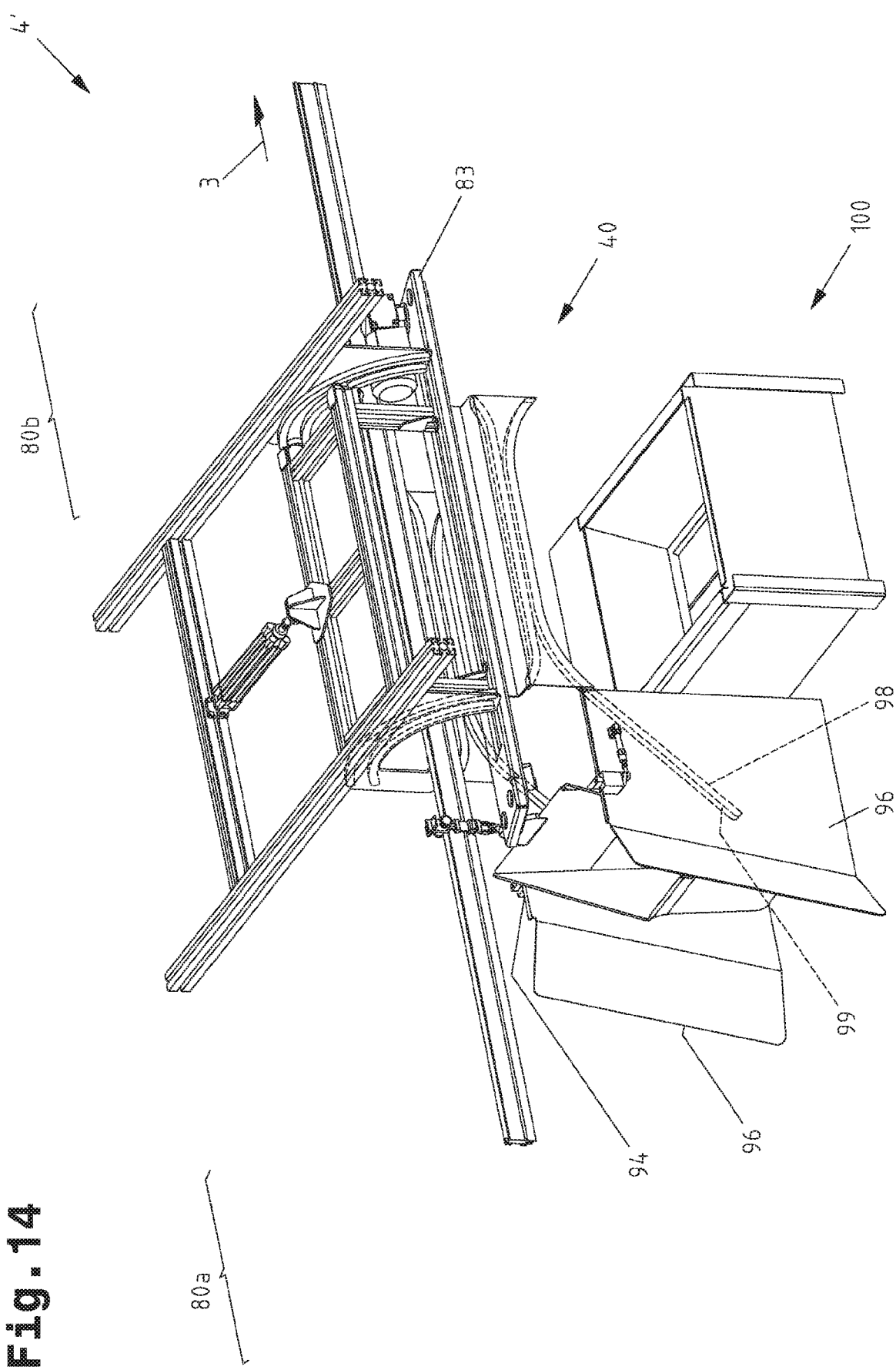
Figure 15:
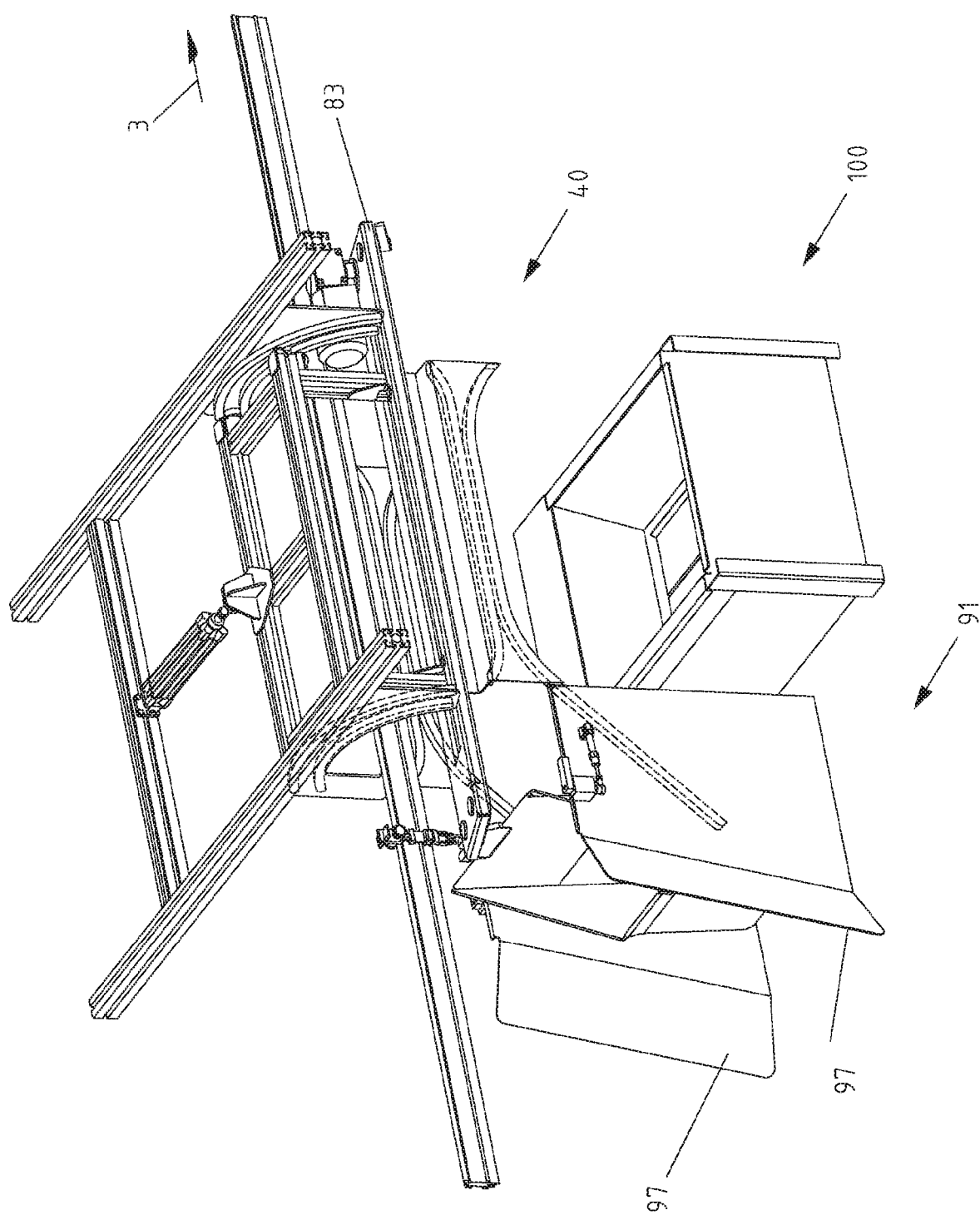

This method step comprises positioning of the article container 2 against the stopper elements 93 moved into the engaging position projecting into the transport path 82, which is carried out prior to adjustment of the bag body from the closed position into the opened position (step i)), as can in particular be seen in FIG. 14.

Likewise, unloading can be carried out such in step ii) that in the unloading position 59 of the article container 2, the article 28 is first discharged from the article container 2 to the filling device 100 and subsequently from the filling device 100 to a receiving container 101 provided below the filling device 100, as is shown in FIGS. 21*a* and 21*c*.

The unloading station 4; 4' described above is arranged along an overhead conveyor system, which comprises the unloading station 4; 4' and at least the overhead conveying device 1 for transporting the article containers into the unloading station 4; 4' and for transporting the article containers 2 out of the unloading station 4; 4'. However, the overhead conveyor system can also comprise the overhead conveying device 1 for transporting the article containers 2 into the unloading station 4; 4' and for transporting the article containers 2 out of the unloading station 4; 4, an overhead conveying device arranged upstream thereof (adumbrated by dashed lines in FIG. 1) for transporting article containers 2 and an overhead conveying device arranged downstream thereof (adumbrated by dashed lines in FIG. 1) for transporting article containers 2. The overhead conveying devices are shown separately in FIG. 1 for reasons of clarity. In fact, the overhead conveying devices are directly connected to each other.

It should also be noted that the article container positioning device 91 and/or the filling device 100 and/or the conveying device 102 can also be applied in the unloading station 4 (FIGS. 1 to 11, 12*a*, 12*b*).

Moreover, it should be noted that the overhead conveyor system can comprise an overhead conveying device 1 described above for transporting article containers 2 and a loading station for loading the article containers 2, which are not shown in further detail.

In this case, the loading station is designed like the unloading station 4; 4', with the difference that the actuation device 56 is omitted.

In any case, the loading station comprises the overhead conveying device 1 described above for transporting the article containers 2 into the loading station and for transporting the article containers 2 out of the loading station, the opening and closing device 40 described above and the article container positioning device 91 described above. If the feed drive 83 is also provided, it is arranged stationarily.

For automated loading of the article container 2, a conveying device, for example a belt conveyor, is also provided, the conveying direction of which extends essentially perpendicular to the vertical plane 92. The article 28 can be placed on the conveying device either manually by a person or automatically by a robot.

After the bag body has been adjusted from the closed position (FIG. 3*a*) into the opened position (FIG. 3*b*) by means of the opening and closing device 40, the article container 2 can be loaded via the unloading opening 29, which in this case also forms a loading opening. A conveying plane of the conveying device preferably extends slightly higher than the bottom 35. It can also be provided that on a side opposite to the loading opening an impact wall parallel to the vertical plane 92 is provided so as to prevent that an article 28 falls out of the bag body during the loading operation. The article 28 does not necessarily have to be positioned against the side wall stop 29 when the article container 2 is loaded.

Once the article container 2 has been loaded, the bag body is adjusted from the opened position into the closed position by means of the opening and closing device 40 and the article 28 is held between the front wall 25 and the rear wall 26.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS

| | |
|---|---|
| 1 | overhead conveying device |
| 2 | article container |
| 3 | transport direction |
| 4, 4' | unloading station |
| 5 | drive device |
| 6 | transport carrier |
| 7 | suspended body |
| 8 | roller |

| | |
|---|---|
| 9 | friction surface |
| 10 | friction belt |
| 11 | profile rail |
| 12 | |
| 13 | suspended support |
| 14 | axis |
| 15 | coupling element |
| 16 | coupling element |
| 17 | pivotal mounting |
| 18 | pivot bearing axle |
| 19 | |
| 20 | frame |
| 21 | cross strut |
| 22 | longitudinal strut |
| 23 | receptacle |
| 24 | longitudinal axis |
| 25 | front wall |
| 26 | rear wall |
| 27 | storage space |
| 28 | article |
| 29 | unloading opening |
| 30 | side wall stop |
| 31 | |
| 32 | |
| 33 | |
| 34 | planking |
| 35 | bottom |
| 36 | holding surface |
| 37a, 37b | longitudinal edge |
| 38a, 38b | end edge |
| 39 | unloading device |
| 40 | opening and closing device |
| 41 | driver mechanism |
| 42 | driver mechanism |
| 43 | support frame |
| 44 | support frame |
| 45 | inlet section |
| 46 | outlet section |
| 47 | unloading section |
| 48 | guide track |
| 49 | guide track |
| 50 | guide track |
| 51 | drive |
| 52 | opening flap |
| 53 | opening and closing device |
| 54 | guide surface |
| 55 | guide profile |
| 56 | actuation device unloading device |
| 57 | tilting axis |
| 58 | provisioning position |
| 59 | unloading position |
| 60 | drive |
| 61 | frame structure |
| 62 | guide assembly |
| 63 | support construction |
| 64 | guide track |
| 65 | guide roller |
| 66 | guide roller |
| 67 | support frame |
| 68 | support frame |
| 69 | frame connection |
| 70 | locking device |
| 71 | drive |
| 72 | arresting element |
| 73 | profile crosspiece |
| 74 | sensor system |
| 75 | guide device |
| 76 | receiving profile |
| 77 | pressing unit |
| 80a | conveying section |
| 80b | conveying section |
| 80c | conveying section |
| 81 | guide device |
| 82 | transport path |
| 83 | feed drive |
| 84 | support frame |
| 85 | traction means |
| 86-1 | driver finger |
| 86-2 | driver finger |
| 87 | drive wheel |
| 88 | deflection wheel |
| 89 | drive motor |
| 90 | guide slat |
| 91 | article container positioning device |
| 92 | vertical plane |
| 93 | stopper element |
| 94 | drive |
| 96 | guide wall |
| 97 | inlet chamfer |
| 98 | driver mechanism |
| 99 | guide track |
| 100 | filling device |
| 101 | receiving container |
| 102 | conveying device |
| 103 | bottom shelf |
| 104 | bottom opening |

The invention claimed is:

1. An unloading station (4; 4') for unloading an article container (2) loaded with at least one article (28),
the article container (2) comprising
a frame (20),
a bag body having a front wall (25) and a rear wall (26), wherein the front wall (25) and the rear wall (26) of the bag body comprise a flexible material suspended on the frame (20),
a storage space (27) delimited by the front wall (25) and the rear wall (26) and
an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container (2), and an opened position, in which the storage space (27) is maximized in volume and the article (28) can be discharged from the article container through the unloading opening (29),
the unloading station (4; 4') comprising
an overhead conveying device (1) for transporting the article container (2) into the unloading station (4; 4') and for transporting the article container (2) out of the unloading station (4; 4),
an opening and closing device (40; 53) for adjusting the bag body between the closed position and the opened position,
an unloading device (39) for unloading the article container (2), wherein the unloading device (39) comprises an actuation device (56), by means of which the article container (2) with the bag body can be tilted about a tilting axis (57) extending essentially in parallel to the longitudinal extension of the overhead conveying device (1) between a provisioning position (58) and an unloading position (59), wherein in the unloading position (59), the article (28) can be discharged from the article container (2) through the unloading opening (29).

2. The unloading station according to claim 1, wherein the article container (2) additionally comprises
a suspended support (13) for suspended transport on the overhead conveying device (1) and having a receptacle (23),
wherein the bag body is suspended on the suspended support (13) by means of the frame (20),
wherein the frame (20) is mounted on the suspended support (13) in the receptacle (23) so as to be pivotable relative to the suspended support (13) about a longitudinal axis (24) of the receptacle (23), whereby the bag body can be adjusted between the closed position and the opened position.

3. The unloading station according to claim 2, wherein the opening and closing device (40; 53) comprises an actuation device (41, 42; 52) for automatic opening and closing of the bag body, by means of which actuation device (41, 42; 52) the frame (20) can be pivoted about the longitudinal axis (24) relative to the suspended support (13) such that the bag body can be adjusted between the closed position and the opened position.

4. The unloading station according to claim 3, wherein the actuation device comprises a driver mechanism (41, 42) having
- an inlet section (45) aligned upstream in a transport direction (3) of the article container (2),
- an outlet section (46) aligned downstream in the transport direction (3) of the article container (2), and
- an unloading section (47) arranged between the inlet section (45) and the outlet section (46), wherein the inlet section (45) forms a tilted guide track (48) that can be brought into an abutting contact with the frame (20) such that the frame (20) is pivoted during the transport of the article container (2) into the unloading station (4; 4), whereby the bag body is adjusted from the closed position into the opened position.

5. The unloading station according to claim 4, wherein the unloading section (47) forms an essentially horizontal guide track (49) that can be brought into an abutting contact with the frame (20) such that the frame (20) is held in the pivoted deflection position during the unloading operation, whereby the bag body also remains in the opened position.

6. The unloading station according to claim 4, wherein the outlet section (46) forms a tilted guide track (50) that can be brought into an abutting contact with the frame (20) such that the frame (20) is pivoted during the transport of the article container (2) out of the unloading station (4; 4), whereby the bag body is adjusted from the opened position into the closed position.

7. The unloading station according to claim 3, wherein the actuation device comprises at least one opening flap (52) movable by means of a drive (51) between a first flap position and a second flap position for adjusting the bag body (2) between the closed position and the opened position.

8. The unloading station according to claim 7, wherein the opening flap (52) in the second flap position comprises a guide surface (54) for guiding the frame (20) during a leaving of the unloading station (4; 4') which extends in the transport direction (3) of the article container (2).

9. The unloading station according to claim 3, wherein the actuation device (56) of the unloading device (39) comprises a frame structure (61) that can be tilted by means of a drive (60) between an initial position and an actuation position about an axis extending in parallel to the transport direction (3) of the article container (2) and wherein the actuation device (41, 42; 52) of the opening and closing device (40; 53) is mounted on the frame structure (61).

10. The unloading station according to claim 2, wherein the overhead conveying device (1) comprises transport carriers (6) movable by means of a drive device (5) or by means of gravity, wherein a transport carrier (6) of the transport carriers (6) and the suspended support (13) are coupled to one another in an articulated manner, whereby the suspended support (13) is pivotable about an axis (14) extending essentially in parallel to the overhead conveying device (1) relative to the transport carrier (6).

11. The unloading station according to claim 1, wherein the frame (20) comprises cross struts (21) and longitudinal struts (22), and wherein the front wall (25) and the rear wall (26) of the bag body are each arranged on one of the cross struts (21) of the frame (20).

12. The unloading station according to claim 11, wherein the frame (20) forms an essentially square outer contour and the cross struts (21) and the longitudinal struts (22) have essentially the same lengths.

13. The unloading station according to claim 1, wherein the overhead conveying device (1) comprises transport carriers (6) movable by means of a drive device (5) or by means of gravity and wherein the unloading station (4; 4') comprises a locking device (70) for locking at least one transport carrier (6) of the transport carriers (6) during an unloading operation of the article container (2).

14. The unloading station according to claim 1, wherein the overhead conveying device (1) comprises transport carriers (6) movable by means of a drive device (5) or by means of gravity and wherein the unloading station (4; 4') comprises a guide device (75) for laterally guiding at least one transport carrier (6) of the transport carriers (6) during a transport movement of the transport carrier (6) with the overhead conveying device (1) for transporting the article container (2) into the unloading station (4; 4') and for transporting the article container (2) out of the unloading station (4; 4).

15. The unloading station according to claim 1, wherein the bag body further comprises a bottom (35),
wherein the bottom (35) comprises
a first longitudinal edge (37a),
a second longitudinal edge (37b) extending at a distance from the first longitudinal edge (37a),
a first end edge (38a) extending between the first longitudinal edge (37a) and the second longitudinal edge (37b),
a second end edge (38b) extending between the first longitudinal edge (37a) and the second longitudinal edge (37b),
wherein the unloading opening (29) is delimited by the front wall (25) and the rear wall (26) and adjoins the first end edge (38a) when the bag body is in the opened position.

16. The unloading station according to claim 15, wherein the front wall (25) is provided with the bottom (35).

17. The unloading station according to claim 15, wherein the bag body comprises a side wall stop (30) adjoining the second end edge (38b), against which the article (28) can be applied.

18. The unloading station according to claim 15, wherein the first longitudinal edge (37a) forms a first folding edge and the second longitudinal edge (37b) forms a second folding edge.

19. The unloading station according to claim 15, wherein the bottom (35) forms a receiving surface (36) ending in the unloading opening (29), on which the article (28) can be supported when the bag body is in the opened position.

20. The unloading station according to claim 19, wherein the receiving surface (36) defines a sliding surface.

21. The unloading station according to claim 1, wherein the overhead conveying device (1) comprises a guide device (81) and transport carriers (6) movable along the guide device (81) by means of a drive device (5).

22. The unloading station according to claim 21, wherein the drive device (5) in a conveying section (80c) along the unloading station (4') comprises a feed drive (83), the feed drive (83) comprising
- a support frame (84),
- a traction drive which is mounted on the support frame (84) and has a traction means (85) that can be driven by a drive motor (89) and
- at least one driver finger (86-1, 86-2) coupled with the traction means (85) for drive movement of the article container (2) along the guide device (81).

23. The unloading station according to claim 22, wherein the conveying section (80c) forms a transport path (82) along which the article containers (2) are transported, and wherein the at least one driver finger (86-1, 86-2) can be moved between an initial position retracted from the transport path (82) and an engaging position projecting into the transport path (82) by means of the traction drive, wherein the at least one driver finger (86-1, 86-2) in the engaging position can be brought into a positive locking engagement with the transport carrier (6) or the article container (2) and by which the article container (2) can be moved along the conveying section (80c).

24. The unloading station according to claim 22, wherein the actuation device (56) of the unloading device (39) comprises a frame structure (61) that can be tilted by means of a drive (60) between an initial position and an actuation position about an axis extending in parallel to the transport direction (3) of the article container (2) and wherein both the actuation device (41, 42; 52) of the opening and closing device (40; 53) and the feed drive (83) are mounted on the frame structure (61).

25. The unloading station according to claim 21, wherein an article container positioning device (91) is provided in a conveying section (80c) along the unloading station (4; 4') and upstream of the opening and closing device (40; 53).

26. The unloading station according to claim 25, wherein the conveying section (80c) forms a transport path (82), along which the article containers (2) are transported, and wherein the article container positioning device (91) comprises stopper elements (93) arranged on both sides of the transport path (82) and symmetrically to a vertical plane (92) extending in the direction of the transport path (82), which stopper elements can be moved between a release position retracted from the transport path (82) and an engaging position projecting into the transport path (82) by means of at least one drive (94), wherein the article container (2) can be positioned against the stopper elements (93) which have been moved into the engaging position.

27. The unloading station according to claim 21, wherein an article container guide device (91) is provided in a conveying section (80c) along the unloading station (4; 4') and upstream of the opening and closing device (40; 53).

28. The unloading station according to claim 27, wherein the conveying section (80c) forms a transport path (82), along which the article containers (2) are transported, and wherein the article container guide device (91) comprises guide walls (96) arranged on both sides of the transport path (82) and symmetrically to a vertical plane (92) extending in the direction of the transport path (82).

29. The unloading station according to claim 28, wherein the guide walls (96) form inlet chamfers (97) arranged symmetrically to the vertical plane (92) extending in the direction of the transport path (82) and tapering towards each other in a tilted manner in the direction of the opening and closing device (40; 53).

30. The unloading station according to claim 28, wherein at least one of the guide walls (96) is provided with a driver mechanism (98), wherein the driver mechanism (98) forms a tilted guide track (99) that can be brought into an abutting contact with the frame (20) such that the frame (20) is pivoted during transport of the article container (2) into the opening and closing device (40; 53), whereby the bag body is adjusted from the closed position in the direction of the opened position.

31. The unloading station according to claim 21, wherein the unloading station (4; 4') additionally comprises a filling device (100) below the unloading position, by means of which filling device (100) in a first step i), the article (28) dropped by the article container (2) is received and in a second step ii), the article (28) is transferred to a receiving container (101).

32. The unloading station according to claim 31, wherein the filling device (100) comprises a bottom shelf (103) and a bottom opening (104) that can be opened and closed by the bottom shelf (103).

33. The unloading station according to claim 31, wherein the unloading station (4; 4') additionally comprises a conveying device (102) for transporting the receiving container (101) into a filling position and for transporting the receiving container (101) away from the filling position, the conveying device being arranged below the filling device (102).

34. A method for unloading an article (28) from an article container (2) at an unloading station (4; 4), the article container (2) comprising
- a frame (20),
- a bag body having a front wall (25) and a rear wall (26), wherein the front wall (25) and the rear wall (26) of the bag body comprise a flexible material suspended on the frame (20),
- a storage space (27) delimited by the front wall (25) and the rear wall (26), and
- an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container, and an opened position, in which the storage space (27) is maximized in volume and the article (28) can be discharged from the article container through the unloading opening (29), the unloading station (4; 4') comprising
- an overhead conveying device (1) for transporting the article container (2) into the unloading station (4; 4') and for transporting the article container (2) out of the unloading station (4; 4),
- an opening and closing device (40; 53) for adjusting the bag body between the closed position and the opened position,
- an unloading device (39) for unloading the article container (2), wherein for unloading an article (28) from an article container (2)
i) in one step, the bag body is adjusted from the closed position into the opened position by means of the opening and closing device (40; 53), and
ii) in one step, the article container (2) with the bag body is tilted about a tilting axis (57) extending essentially in parallel to the longitudinal extension of the overhead conveying device (1) from a provisioning position (58) into an unloading position (59) by means of the unloading device (39), whereby the article (28) is discharged from the article container (2) through the unloading opening (29).

35. The method for unloading an article according to claim 34, wherein step i) and step ii) are carried out sequentially in time, in that the article container (2) is transported to the unloading station (4; 4') by the overhead conveying device (1) and stopped at the unloading station (4; 4') and then
    in a first step i) the bag body is adjusted from the closed position into the opened position by the opening and closing device (40; 53), and subsequently
    in a second step ii) the article container (2) with the bag body, which is adjusted into the opened position, is tilted about the tilting axis (57) extending essentially in parallel to the longitudinal extension of the overhead conveying device (1) from the provisioning position (58) into the unloading position (59) by means of the unloading device (39), whereby the article (28) is discharged from the article container (2) through the unloading opening (29).

36. The method for unloading an article according to claim 34, wherein step i) and step ii) are carried out so as to overlap in time, in that the article container (2) is transported to the unloading station (4; 4') by the overhead conveying device (1) and is continuously moved at the unloading station (4; 4), wherein during the continuous transport movement of the article container (2)
    in step i) the bag body is adjusted from the closed position into the opened position by the opening and closing device (40; 53), and simultaneously
    in step ii) the article container (2) with the bag body is tilted about the tilting axis (57) extending essentially in parallel to the longitudinal extension of the overhead conveying device (1) from the provisioning position (58) into the unloading position (59) by means of the unloading device (39), whereby the article (28) is discharged from the article container (2) through the unloading opening (29).

37. The method for unloading an article according to claim 34, wherein after unloading the article container (2)
    in a step iii) the article container (2) with the bag body is tilted back about a tilting axis (57) extending essentially in parallel to the longitudinal extension of the overhead conveying device (1) from the unloading position (59) into the provisioning position (58) by means of the unloading device (39), and
    in a step iv) the bag body is adjusted from the opened position into the closed position by means of the opening and closing device (40; 53).

38. The method for unloading an article according to claim 34, wherein the opening and closing device (40; 53) comprises a driver mechanism (41, 42) having
    an inlet section (45) aligned upstream in a transport direction (3) of the article container (2),
    an outlet section (46) aligned downstream in the transport direction (3) of the article container (2), and
    an unloading section (47) arranged between the inlet section (45) and the out-let section (46),
    wherein the inlet section (45) forms a tilted guide track (48) that can be brought into an abutting contact with the frame (20) such that the frame (20) is pivoted during the transport of the article container (2) into the unloading station (4; 4), whereby the bag body is adjust-ed from the closed position into the opened position.

39. The method for unloading an article according to claim 38, wherein the unloading section (47) forms an essentially horizontal guide track (49) that can be brought into an abutting contact with the frame (20) such that the frame (20) is held in the pivoted deflection position during the unloading operation, whereby the bag body also remains in the opened position.

40. The method for unloading an article according to claim 38, wherein the outlet section (46) forms a tilted guide track (50) that can be brought into an abutting contact with the frame (20) such that the frame (20) is pivoted during the transport of the article container (2) out of the unloading station (4; 4), whereby the bag body is adjust-ed from the opened position into the closed position.

41. The method for unloading an article according to claim 34, wherein an article container positioning device (91) is provided in a conveying section (80*c*) along the unloading station (4; 4') and upstream of the opening and closing device (40; 53), which article container positioning device (91) comprises stopper elements (93) arranged on both sides of the transport path (82) and symmetrically to a vertical plane (92) extending in the direction of the transport path (82), which stopper elements can be moved between a release position retracted from the transport path (82) and an engaging position projecting into the transport path (82) by means of at least one drive (94), wherein prior to step i) the article container (2) is positioned against the stopper elements (93) which have been moved into the engaging position projecting into the transport path (82).

42. The method for unloading an article according to claim 33, wherein additionally a filling device (100) is provided below the unloading position, wherein in step ii) the article (28) is first discharged from the article container (2) to the filling device (100) and subsequently from the filling device (100) to a receiving container (101) provided below the filling device (100).

43. An unloading station (4; 4') for unloading an article container (2) loaded with at least one article (28),
    the article container (2) comprising
        a suspended support (13),
        a bag body having a front wall (25) and a rear wall (26),
        a storage space (27) delimited by the front wall (25) and the rear wall (26) and
        an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container (2), and an opened position, in which the storage space (27) is maximized in volume and the article (28) can be discharged from the article container through the unloading opening (29),
    the unloading station (4; 4') comprising
        an overhead conveying device (1) for transporting the article container (2) into the unloading station (4; 4') and for transporting the article container (2) out of the unloading station (4; 4), wherein the overhead conveying device (1) comprises transport carriers (6) movable by means of a drive device (5) or by means of gravity, wherein a transport carrier (6) of the transport carriers (6) and the suspended support (13) are coupled to one another in an articulated manner, whereby the suspended support (13) is pivotable about an axis (14) extending essentially in parallel to the overhead conveying device (1) relative to the transport carrier (6),
        an opening and closing device (40; 53) for adjusting the bag body between the closed position and the opened position, an unloading device (39) for unloading the article container (2), wherein the unloading device (39) comprises an actuation device (56), by means of which the article container (2) with the bag body can be tilted about a tilting axis (57) extending essentially in parallel to the longitudinal extension of the overhead conveying device (1) between a provisioning position (58) and an unloading position (59), wherein in the unloading position (59), the article (28) can be discharged from the article container (2) through the unloading opening (29).

44. The unloading station according to claim 43, wherein the article container (2) further comprises a frame (20) mounted on the suspended support (13) so as to be pivotable relative to the suspended support (13), whereby the bag body can be adjusted between the closed position and the opened position, and wherein the bag body is suspended on the suspended support (13) by means of the frame (20).

45. An unloading station (4; 4') for unloading an article container (2) loaded with at least one article (28), the article container (2) comprising
a bag body having a front wall (25) and a rear wall (26),
a storage space (27) delimited by the front wall (25) and the rear wall (26) and
an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container (2), and an opened position, in which the storage space (27) is maximized in volume and the article (28) can be discharged from the article container through the unloading opening (29),
the unloading station (4; 4') comprising
an overhead conveying device (1) for transporting the article container (2) into the unloading station (4; 4') and for transporting the article container (2) out of the unloading station (4; 4), wherein the overhead conveying device (1) comprises a guide device (81) and transport carriers (6) movable along the guide device (81) by means of a drive device (5), wherein a transport carrier (6) of the transport carriers (6) supports the article container (2),
an opening and closing device (40; 53) for adjusting the bag body between the closed position and the opened position,
an article container positioning device (91) arranged in a conveying section (80c) along the unloading station (4; 4') and upstream of the opening and closing device (40; 53),
an unloading device (39) for unloading the article container (2), wherein the unloading device (39) comprises an actuation device (56), by means of which the article container (2) with the bag body can be tilted about a tilting axis (57) extending essentially in parallel to the longitudinal extension of the overhead conveying device (1) between a provisioning position (58) and an unloading position (59), wherein in the unloading position (59), the article (28) can be discharged from the article container (2) through the unloading opening (29).

46. The unloading station according to claim 45, wherein the conveying section (80c) forms a transport path (82), along which the article containers (2) are transported, and wherein the article container positioning device (91) comprises stopper elements (93) arranged on both sides of the transport path (82) and symmetrically to a vertical plane (92) extending in the direction of the transport path (82), which stopper elements can be moved between a release position retracted from the transport path (82) and an engaging position projecting into the transport path (82) by means of at least one drive (94), wherein the article container (2) can be positioned against the stopper elements (93) which have been moved into the engaging position.

47. An unloading station (4; 4') for unloading an article container (2) loaded with at least one article (28), the article container (2) comprising
a bag body having a front wall (25) and a rear wall (26),
a storage space (27) delimited by the front wall (25) and the rear wall (26) and
an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container (2), and an opened position, in which the storage space (27) is maximized in volume and the article (28) can be discharged from the article container through the unloading opening (29),
the unloading station (4; 4') comprising
an overhead conveying device (1) for transporting the article container (2) into the unloading station (4; 4') and for transporting the article container (2) out of the unloading station (4; 4), wherein the overhead conveying device (1) comprises a guide device (81) and transport carriers (6) movable along the guide device (81) by means of a drive device (5), wherein a transport carrier (6) of the transport carriers (6) supports the article container (2),
an opening and closing device (40; 53) for adjusting the bag body between the closed position and the opened position,
an article container positioning device (91) arranged in a conveying section (80c) along the unloading station (4; 4') and upstream of the opening and closing device (40; 53),
an article container guide device (91) arranged in a conveying section (80c) along the unloading station (4; 4') and upstream of the opening and closing device (40; 53),
an unloading device (39) for unloading the article container (2), wherein the unloading device (39) comprises an actuation device (56), by means of which the article container (2) with the bag body can be tilted about a tilting axis (57) extending essentially in parallel to the longitudinal extension of the overhead conveying device (1) between a provisioning position (58) and an unloading position (59), wherein in the unloading position (59), the article (28) can be discharged from the article container (2) through the unloading opening (29).

48. The unloading station according to claim 47, wherein the conveying section (80c) forms a transport path (82), along which the article containers (2) are transported, and wherein the article container guide device (91) comprises guide walls (96) arranged on both sides of the transport path (82) and symmetrically to a vertical plane (92) extending in the direction of the transport path (82).

49. The unloading station according to claim 48, wherein the guide walls (96) form inlet chamfers (97) arranged symmetrically to the vertical plane (92) extending in the direction of the transport path (82) and tapering towards each other in a tilted manner in the direction of the opening and closing device (40; 53).

50. The unloading station according to claim 48, wherein at least one of the guide walls (96) is provided with a driver mechanism (98), wherein the driver mechanism (98) forms a tilted guide track (99) that can be brought into an abutting contact with the frame (20) such that the frame (20) is pivoted during transport of the article container (2) into the opening and closing device (40; 53), whereby the bag body is adjusted from the closed position in the direction of the opened position.

51. An unloading station (4; 4') for unloading an article container (2) loaded with at least one article (28),
the article container (2) comprising
   a bag body having a front wall (25) and a rear wall (26),
   a storage space (27) delimited by the front wall (25) and the rear wall (26) and
   an unloading opening (29) formed laterally on the bag body at least in some sections between the front wall (25) and the rear wall (26), wherein the bag body is adjustable between a closed position, in which the storage space (27) is minimized in volume and the article (28) can be transported by means of the article container (2), and an opened position, in which the storage space (27) is maximized in volume and the article (28) can be discharged from the article container through the unloading opening (29),
the unloading station (4; 4') comprising
   an overhead conveying device (1) for transporting the article container (2) into the unloading station (4; 4') and for transporting the article container (2) out of the unloading station (4; 4), wherein the overhead conveying device (1) comprises a guide device (81) and transport carriers (6) movable along the guide device (81) by means of a drive device (5), wherein a transport carrier (6) of the transport carriers (6) supports the article container (2),
   an opening and closing device (40; 53) for adjusting the bag body between the closed position and the opened position,
   an unloading device (39) for unloading the article container (2), wherein the unloading device (39) comprises an actuation device (56), by means of which the article container (2) with the bag body can be tilted about a tilting axis (57) extending essentially in parallel to the longitudinal extension of the overhead conveying device (1) between a provisioning position (58) and an unloading position (59), wherein in the unloading position (59), the article (28) can be discharged from the article container (2) through the unloading opening (29),
   a filling device (100) below the unloading position, by means of which filling device (100) in a first step i), the article (28) dropped by the article container (2) is received and in a second step ii), the article (28) is transferred to a receiving container (101).

52. The unloading station according to claim 51, wherein the filling device (100) comprises a bottom shelf (103) and a bottom opening (104) that can be opened and closed by the bottom shelf (103).

53. The unloading station according to claim 51, wherein the unloading station (4; 4') additionally comprises a conveying device (102) for transporting the receiving container (101) into a filling position and for transporting the receiving container (101) away from the filling position, the conveying device being arranged below the filling device (102).

* * * * *